United States Patent
Moon et al.

(10) Patent No.: US 9,178,660 B2
(45) Date of Patent: *Nov. 3, 2015

(54) METHOD OF TRANSMITTING DATA USING CONSTELLATION REARRANGEMENT

(71) Applicant: LG ELECTRONICS INC., Seoul (KR)

(72) Inventors: Sung Ho Moon, Anyang-si (KR); Seung Woo Nam, Anyang-si (KR); Jong Min Kim, Anyang-si (KR); Hyung Ho Park, Anyang-si (KR); Han Gyu Cho, Anyang-si (KR); Jin Soo Choi, Anyang-si (KR); Jae Hoon Chung, Anyang-si (KR); Jong Young Han, Anyang-si (KR); Suk Woo Lee, Anyang-si (KR)

(73) Assignee: LG Electronics Inc., Seoul (KR)

(*) Notice: Subject to any disclaimer, the term of this patent is extended or adjusted under 35 U.S.C. 154(b) by 13 days.

This patent is subject to a terminal disclaimer.

(21) Appl. No.: 13/711,438

(22) Filed: Dec. 11, 2012

(65) Prior Publication Data

US 2013/0139020 A1 May 30, 2013

Related U.S. Application Data

(62) Division of application No. 12/682,110, filed as application No. PCT/KR2008/005947 on Oct. 9, 2008, now abandoned.

(60) Provisional application No. 60/981,111, filed on Oct. 19, 2007.

(30) Foreign Application Priority Data

Oct. 9, 2007 (KR) .................. 10-2007-0101690

(51) Int. Cl.
*G08C 25/02* (2006.01)
*H04L 1/08* (2006.01)
*H04L 1/18* (2006.01)

(52) U.S. Cl.
CPC ............... *H04L 1/08* (2013.01); *H04L 1/1819* (2013.01); *H04L 1/1893* (2013.01)

(58) Field of Classification Search
CPC ... H04L 1/1809; H04L 1/1812; H04L 1/1887; H04L 1/1819; H04L 1/188
USPC .......................................... 714/748; 814/748
See application file for complete search history.

(56) References Cited

U.S. PATENT DOCUMENTS

| 6,700,867 B2* | 3/2004 | Classon et al. ............... 370/216 |
| 8,064,394 B2* | 11/2011 | Jongren et al. ............... 370/329 |
| 8,588,142 B2* | 11/2013 | Seo et al. ...................... 370/328 |
| 2003/0072286 A1 | 4/2003 | Kim et al. |

(Continued)

FOREIGN PATENT DOCUMENTS

| KR | 10-2005-0036827 | 4/2005 |
| KR | 10-2005-0067892 | 9/2005 |
| KR | 10-2006-0091607 | 8/2006 |

*Primary Examiner* — Albert Decady
*Assistant Examiner* — Enam Ahmed
(74) *Attorney, Agent, or Firm* — Dentons US LLP

(57) ABSTRACT

A data retransmission method using hybrid automatic repeat request (harq) includes transmitting a data block, receiving a retransmission request signal for the data block, generating a retransmission block by performing swapping or inversion between bits constituting the data block according to the retransmission request signal, and transmitting the retransmission block.

2 Claims, 13 Drawing Sheets

(56) References Cited

U.S. PATENT DOCUMENTS

| | | |
|---|---|---|
| 2003/0081576 A1 | 5/2003 | Kim et al. |
| 2007/0079207 A1* | 4/2007 | Seidel ............... H04L 1/1845 714/748 |
| 2008/0225965 A1 | 9/2008 | Pi et al. |
| 2008/0320353 A1* | 12/2008 | Blankenship et al. ........ 714/746 |
| 2009/0049359 A1* | 2/2009 | Malladi et al. ................ 714/752 |
| 2009/0100309 A1* | 4/2009 | Zheng .......................... 714/748 |
| 2012/0300616 A1* | 11/2012 | Zeng et al. ................... 370/216 |

* cited by examiner

|  | $T_0$ | $T_1$ | $\cdots$ | $T_m$ |
|---|---|---|---|---|
| 📡 | $S_1^{(0)}$ | $S_1^{(1)}$ | $\cdots$ | $S_1^{(m)}$ |
| 📡 | $S_2^{(0)}$ | $S_2^{(1)}$ | $\cdots$ | $S_2^{(m)}$ |
|  | $\vdots$ | $\vdots$ |  | $\vdots$ |
| 📡 | $S_{Nt}^{(0)}$ | $S_{Nt}^{(1)}$ | $\cdots$ | $S_{Nt}^{(m)}$ |
|  | $\shortparallel$ | $\shortparallel$ |  | $\shortparallel$ |
|  | $S^{(0)}$ | $S^{(1)}$ |  | $S^{(m)}$ |

Fig. 6

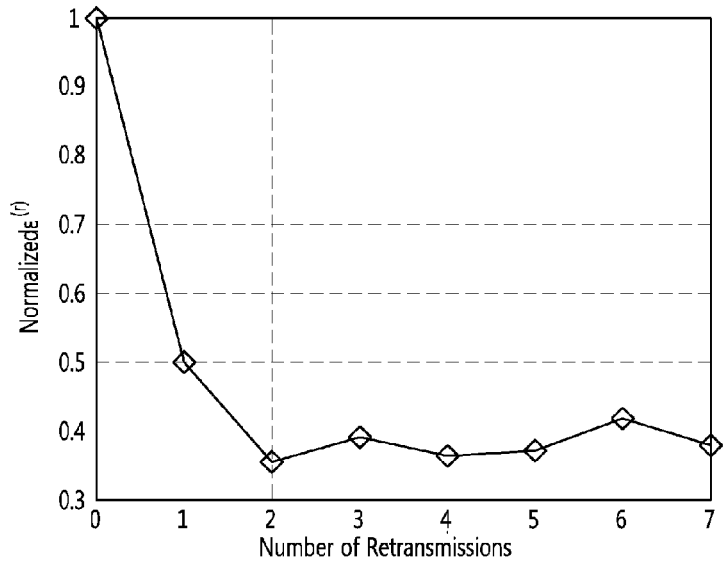

Fig. 7

$$I^{(0)} = \begin{bmatrix} i_{1,1} & i_{1,2} & i_{1,3} \\ i_{2,1} & i_{2,2} & x \end{bmatrix} \quad I^{(1)} = \begin{bmatrix} i_{1,1} & i_{2,2} & i_{2,1} \\ i_{1,3} & i_{1,2} & x \end{bmatrix} \leftrightarrow I^{(2)} = \begin{bmatrix} i_{1,1} & i_{1,3} & i_{2,1} \\ i_{1,2} & i_{2,2} & x \end{bmatrix}$$

$$\updownarrow \text{Bit Inversion} \qquad \updownarrow \text{Bit Inversion} \qquad \updownarrow \text{Bit Inversion}$$

$$I^{(3)} = \begin{bmatrix} i_{1,1} & i_{1,2} & \overline{i_{1,3}} \\ i_{2,1} & i_{2,2} & x \end{bmatrix} \quad I^{(4)} = \begin{bmatrix} i_{1,1} & i_{2,2} & \overline{i_{2,1}} \\ i_{1,3} & i_{1,2} & x \end{bmatrix} \quad I^{(5)} = \begin{bmatrix} i_{1,1} & i_{1,3} & \overline{i_{2,1}} \\ i_{1,2} & i_{2,2} & x \end{bmatrix}$$

$$\updownarrow \text{Bit Inversion} \qquad \updownarrow \text{Bit Inversion} \qquad \updownarrow \text{Bit Inversion}$$

$$I^{(6)} = \begin{bmatrix} i_{1,1} & \overline{i_{1,2}} & i_{1,3} \\ i_{2,1} & i_{2,2} & x \end{bmatrix} \quad I^{(7)} = \begin{bmatrix} i_{1,1} & \overline{i_{2,2}} & i_{2,1} \\ i_{1,3} & i_{1,2} & x \end{bmatrix} \quad I^{(8)} = \begin{bmatrix} i_{1,1} & \overline{i_{1,3}} & i_{2,1} \\ i_{1,2} & i_{2,2} & x \end{bmatrix}$$

$$\updownarrow \text{Bit Inversion} \qquad \updownarrow \text{Bit Inversion} \qquad \updownarrow \text{Bit Inversion}$$

$$I^{(9)} = \begin{bmatrix} i_{1,1} & \overline{i_{1,2}} & \overline{i_{1,3}} \\ i_{2,1} & i_{2,2} & x \end{bmatrix} \quad I^{(10)} = \begin{bmatrix} i_{1,1} & \overline{i_{2,2}} & \overline{i_{2,1}} \\ i_{1,3} & i_{1,2} & x \end{bmatrix} \quad I^{(11)} = \begin{bmatrix} i_{1,1} & \overline{i_{1,3}} & \overline{i_{2,1}} \\ i_{1,2} & i_{2,2} & x \end{bmatrix}$$

Fig. 8

$$I^{(1)} = \begin{bmatrix} i_{1,1} & i_{N_t,2} & i_{N_t-1,3} & \cdots & i_{N_t-B+2,B} \\ i_{2,1} & i_{1,2} & i_{N_t,3} & \cdots & i_{N_t-B+3,B} \\ i_{3,1} & i_{2,2} & i_{1,3} & \cdots & i_{N_t-B+4,B} \\ \vdots & \vdots & \vdots & \vdots & \vdots \\ i_{N_t,1} & i_{N_t-1,2} & i_{N_t-2,3} & \cdots & i_{N_t-B+N_t+1,B} \end{bmatrix}$$

1 step cyclic shift, 2 step cyclic shift, (B-1) step cyclic shift

Fig. 9

$$I^{(0)} = \begin{bmatrix} i_{1,1} & i_{1,2} & i_{1,3} \\ i_{2,1} & i_{2,2} & x \\ i_{3,1} & i_{3,2} & i_{3,3} \\ i_{4,1} & i_{4,2} & x \\ i_{5,1} & i_{5,2} & i_{5,3} \end{bmatrix}$$

$$I^{(1)} = f_{GMSCS}\left(\begin{bmatrix} I_2^{(0)} \\ I_3^{(0)} \end{bmatrix}\right) \cdot D_{row} = f_{GMSCS}\left(\begin{bmatrix} i_{2,1} & i_{2,2} & x \\ i_{4,1} & i_{4,2} & x \\ i_{1,1} & i_{1,2} & i_{1,3} \\ i_{3,1} & i_{3,2} & i_{3,3} \\ i_{5,1} & i_{5,2} & i_{5,3} \end{bmatrix}\right) \cdot D_{row}$$

$$= \begin{bmatrix} i_{2,1} & i_{4,2} & x \\ i_{4,1} & i_{2,2} & x \\ i_{1,1} & i_{5,2} & i_{3,3} \\ i_{3,1} & i_{1,2} & i_{5,3} \\ i_{5,1} & i_{3,2} & i_{1,3} \end{bmatrix} \cdot D_{row} = \begin{bmatrix} i_{1,1} & i_{5,2} & i_{3,3} \\ i_{2,1} & i_{4,2} & x \\ i_{3,1} & i_{1,2} & i_{5,3} \\ i_{4,1} & i_{2,2} & x \\ i_{5,1} & i_{3,2} & i_{1,3} \end{bmatrix}$$

1 step cyclic shift   2 step cyclic shift

METHOD OF TRANSMITTING DATA USING CONSTELLATION REARRANGEMENT

This application is a divisional application of, and claims the benefit of, U.S. patent application Ser. No. 12/682,110, filed Apr. 8, 2010, which is a 35 U.S.C. §371 National Stage Entry of International Application No. PCT/KR2008/005947, filed on Oct. 9, 2008, and claims priority to U.S. Provisional Application No. 60/981,111, filed on Oct. 19, 2007 and Korean Patent Application No. 10-2007-0101690, filed on Oct. 9, 2007, all of which are hereby incorporated by reference in their entireties as if fully set forth herein.

TECHNICAL FIELD

The present invention relates to wireless communications, and more particularly, to a method and apparatus using constellation rearrangement in a wireless communication system.

BACKGROUND ART

Current development in advanced wireless communication has led to the requirement of high spectral efficiency and reliable communication. Unfortunately, packet errors by fading channel environment and interferences originated from various sources make the capacity of overall system to be limited.

Hybrid Automatic Repeat Request (HARQ) which is ARQ protocol combined with Forward Error Correction (FEC) is strongly considered as one of cutting edge technologies for future reliable communication. The HARQ scheme can largely be classified into the type of two. One is HARQ-Chase Combining (CC) which is disclosed in D. Chase, Code Combining: A maximum-likelihood decoding approach for combining an arbitrary number of noisy packets, IEEE Trans. on Commun., Vol. 33, pp. 593-607, May 1985. The other scheme is HARQ-Increment Redundancy (IR). In the HARQ-CC, when a receiver detects an error through cyclic redundancy checking (CRC) while decoding the transmitted packet, the same packet with the same modulation and coding is sent to the receiver, repeatedly. Meanwhile, HARQ-IR retransmits different packets in order to achieve the coding gain, in which parity bits can be manipulated through puncturing and repetition.

Multiple Input Multiple Output (MIMO) systems are regarded as one of the most promising research areas of wireless communication. Spatial diversity provided by multiple antenna configurations for both transmitter and receiver is known to tremendously increase system capacity without additional bandwidth. As a result, various approaches have been studied to use the benefit of transmit diversity and received diversity.

Constellation Rearrangement disclosed by the PCT international application No. PCT/KR2007/003625 filed by this applicant provides additional gain through averaging the difference of inherent reliability between component bits.

There is a need to improve performance of system by applying constellation rearrangement to various schemes such as MIMO system, HARQ, multi-level modulation, etc.

DISCLOSURE OF INVENTION

Technical Problem

The present invention provides a method and apparatus for performing constellation rearrangement in a wireless communication system.

The present invention also provides a method of performing constellation rearrangement in a multiple-antenna system using a multi-modulation scheme.

Technical Solution

In an aspect, a data retransmission method using hybrid automatic repeat request (HARD) includes transmitting a data block, receiving a retransmission request signal for the data block, generating a retransmission block by performing swapping or inversion between bits constituting the data block according to the retransmission request signal, and transmitting the retransmission block.

The swapping between bits may be performed by swapping a bit having a high bit reliability and a bit having a low bit reliability in previous transmission.

In addition, the data block may be a transmission block having a matrix format and consisting of rows whose number is equal to the number of transmit antennas, each row of the transmission block may be transmitted through one transmit antenna, bits constituting one row may represent bits of one data symbol, and the data symbol may be modulated using at least two modulation schemes.

In another aspect, a data retransmission method in a multiple-antenna system includes transmitting a first data symbol modulated with a first modulation scheme through a first transmit antenna and transmitting a second data symbol modulated with a second modulation scheme through a second transmit antenna, generating a new first data symbol and a new second data symbol by performing swapping or inversion on bits constituting the first data symbol and bits constituting the second data symbol, and transmitting the new first data symbol through the first transmit antenna and transmitting the new second data symbol through the second transmit antenna.

In still another aspect, an apparatus for wireless communication includes an radio frequency (RF) unit for transmitting and receiving a radio signal, and a processor coupled with the RF unit, for performing HARQ-increment redundancy (IR), and configured to sequentially configure data blocks in a cyclic buffer of the HARQ-IR according to a retransmission request, and transmit the data blocks, wherein if all or some parts of the data block are wrapped around with a previously transmitted data block, constellation rearrangement is performed on the wraparound parts.

Advantageous Effects

An additional diversity gain can be obtained in a multiple input multiple output (MIMO) system by using constellation rearrangement. Therefore, performance of a wireless communication system can be improved.

BRIEF DESCRIPTION OF THE DRAWINGS

FIG. 6 is a graph showing changes in a minimum squared error (MSE) of average bit reliability with respect to the number of retransmissions according to a proposed bit swapping scheme.

FIG. 7 shows a bit swapping and inversion (BSI) scheme in a 2×2 multiple input multiple output (MIMO) system using 16-QAM and 64-QAM according to an embodiment of the present invention.

FIG. 8 shows an example of a bit shuffling between antennas (BSA) scheme in single modulation transmission.

FIG. 9 shows a BSA scheme in a 5×5 MIMO system using 16-QAM and 64-QAM according to an embodiment of the present invention.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

This technology can be used in downlink or uplink. In general, a downlink denotes a communication link from a base station (BS) to a user equipment (UE), and an uplink denotes a communication link from the UE to the BS. The BS is generally a fixed station that communicates with the UE and may be referred to as another terminology, such as a node-B, a base transceiver system (BTS), an access point, etc. The UE may be fixed or mobile, and may be referred to as another terminology, such as a mobile station (MS), a user terminal (UT), a subscriber station (SS), a wireless device, etc.

The communication system may be a multiple-antenna system having a plurality of transmit antennas. Hereinafter, a multiple-input multiple-output (MIMO) system denotes a system using a plurality of transmit antennas and/or a plurality of receive antennas.

Figure 1:
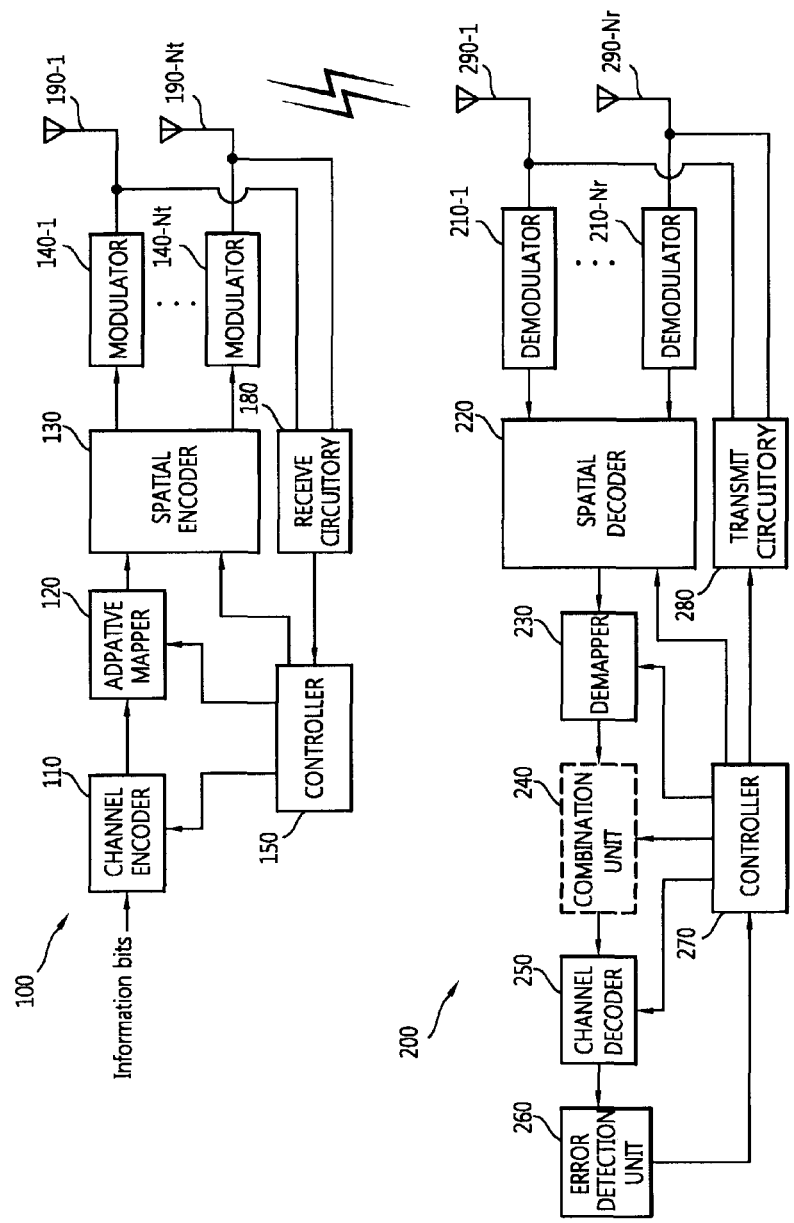
FIG. 1 is a block diagram showing a transmitter and a receiver according to an embodiment of the present invention.

FIG. 1 is a block diagram showing a transmitter and a receiver according to an embodiment of the present invention. A transmitter 100 and a receiver 200 implement hybrid automatic repeat request (HARM). The transmitter 100 and the receiver 200 can be regarded as a transceiver that performs both a transmission function and a reception function. For clear explanation of data retransmission, one side that transmits and retransmits data is referred to as the transmitter 100, and the other side that receives data and requests data retransmission is referred to as the receiver 200. In downlink, the transmitter 100 may be a part of a BS, and the receiver 200 may be a part of a UE. In uplink, the transmitter 100 may be a part of the UE, and the receiver 200 may be a part of the BS. The BS may include a plurality of receivers and a plurality of transmitters. The UE may include a plurality of receivers and a plurality of transmitters.

Referring to FIG. 1, a transmitter 100 includes a channel encoder 110, an adaptive mapper 120, a spatial encoder 130, a controller 150, and a receive circuitory 180. Further, the transmitter 100 includes Nt modulators 140-1, . . . , 140-Nt and Nt transmit antennas 190-1, . . . , 190-Nt, where Nt is greater than one (i.e., Nt>1).

The channel encoder 110 receives a stream of information bits and encodes the received stream of information bits according to a predetermined coding scheme. As a result, coded data is generated. The adaptive mapper 120 modulates the coded data according to a predetermined modulation scheme and thus provides a data symbol. The adaptive mapper 120 can use at least two modulation schemes. The adaptive mapper 120 maps the coded data to the data symbol representing a position on a signal constellation. Further, the adaptive mapper 120 adaptively remaps the coded data in response to a retransmission request message of the controller 150. There is no limit in the modulation scheme used by the adaptive mapper 120. The modulation scheme may be an M-ary quadrature amplitude modulation (M-QAM). Examples of the M-QAM include 16-QAM, 64-QAM, and 256-QAM. Detailed operations of the adaptive mapper 120 will be described below.

The spatial encoder 130 processes data symbols output through the adaptive mapper 120 according to a MIMO pre-processing scheme. The modulators 140-1, . . . , 140-Nt modulate symbols output from the spatial encoder 130 and transmit the modulated symbols through the respective transmit antennas 190-1, . . . , 190-Nt. When the modulators 140-1, . . . , 140-Nt perform an inverse fast Fourier transform (IFFT), orthogonal frequency division multiplexing (OFDM) symbols are output. The receive circuitory 180 receives signals transmitted from the receiver 200 through the transmit antennas 190-1, . . . , 190-Nt. The receive circuitory 180 digitizes the received signals and then transmits the digitized signals to the controller 150.

The controller 150 controls overall operations of the transmitter 100. The controller 150 extracts information from signals received from the receive circuitory 180. An operation of extracting the information includes general modulation and decoding. The extracted information may include a retransmission request signal. The controller 150 prepares a retransmission symbol by controlling the adaptive mapper 120 in response to the retransmission request signal.

A channel quality indicator (CQI) may be included in the information extracted from the signal received from the receive circuitry 180. The CQI may be information on a channel condition from the receiver 200 to the transmitter 100 or index information on a modulation and coding scheme. The CQI can be used by the controller 150 to control the channel encoder 110 or the adaptive mapper 120. Thus, a coding scheme of the channel encoder 110 or a mapping scheme of the adaptive mapper 120 can be adaptively changed.

Meanwhile, a receiver 200 includes a spatial decoder 220, a demapper 230, a channel decoder 250, an error detector 260, a controller 270, and a transmit circuitry 280. Further, the receiver 200 includes Nr receive antennas 290-1, ..., 290-Nr, where Nr is greater than one (i.e., Nr>1).

Signals received from the receive antennas 290-1, ..., 290-Nr are demodulated by demodulators 210-1, ..., 210-Nr and then are input to the spatial decoder 220. The spatial decoder 220 processes the received signals according to a MIMO post-processing scheme in response to a MIMO control signal. The MIMO control signal controls decoding according to a space time coding (STC) scheme of the receiver 200. The MIMO control signal may be pre-defined by a memory (not shown) of the controller 270. Alternatively, the MIMO control signal may be received from the transmitter 100.

The demapper 230 demaps data symbols from coded data according to a demapping control signal provided from the controller 270. The demapping control signal controls the demapper 230 according to a mapping scheme used in the adaptive mapper 120 of the transmitter 100. The demapping control signal may be pre-defined by the memory of the controller 270. Alternatively, the demapping control signal may be received from the transmitter 100.

The receiver 200 may include a combination unit 240 that combines a retransmitted symbol and a previous symbol. That is, in case of using an HARQ scheme such as HARQ-chase combining (CC) or HARQ-incremental redundancy (IR), the combination unit 240 combines retransmitted symbols and previous symbols. A combining scheme in use may be an equal-gain combining scheme in which combination is performed using an average value by assigning the same weight factor to both previous data and retransmitted data. The combining scheme may be a maximal ratio combining (MRC) scheme in which weight factors are assigned to respective pieces of data. There is no limit in the combining scheme, and thus other various schemes may also be used.

The technical features of the present invention are not limited to the HARQ-CC or HARQ-UR scheme, and can also apply to an HARQ scheme in which channel decoding is performed using only retransmitted symbols without being combined with previous symbols. In this case, the receiver 200 may not include the combination unit 240 as indicated by a dotted line in the figure.

The channel decoder 250 decodes coded data according to a predetermined decoding scheme. The error detector 260 detects an error from a decoded data bit by using cyclic redundancy check (CRC).

The controller 270 controls overall operations of the receiver 200 and provides a retransmission request signal or the like to the transmit circuitry 280. For this, the controller 270 can perform general channel encoding, modulation, etc. The controller 270 receives a result of error detection from the channel decoder 250 and determines whether to request retransmission. The controller 270 may generate a positive acknowledgement (ACK) signal if no error is detected, and may generate a negative acknowledgement (NACK) signal if an error is detected. The NACK signal may be the retransmission request signal.

Further, the controller 270 can provide a CQI signal by measuring channel quality from received signals. The CQI signal is a feedback signal to be fed back to the transmitter 100. The feedback signal indicates channel quality such as a signal-to-noise ratio (SNR) or an error rate. The transmit circuitry 280 receives the retransmission request signal or the like from the controller 270, and transmits the received signal through the receive antennas 290-1, ..., 290-Nr.

I. Constellation Rearrangement for Multi-Modulation Transmission.

Different modulation schemes (hereinafter, multi-modulation transmission) can be used for respective transmit antennas in a MIMO system. For example, a 1st transmit antenna may use 16-QAM and a 2nd transmit antenna may use 64-QAM. A method of performing constellation rearrangement in a multiple-antenna system in which various modulation schemes co-exist for respective transmit antennas will be described.

Figure 2:
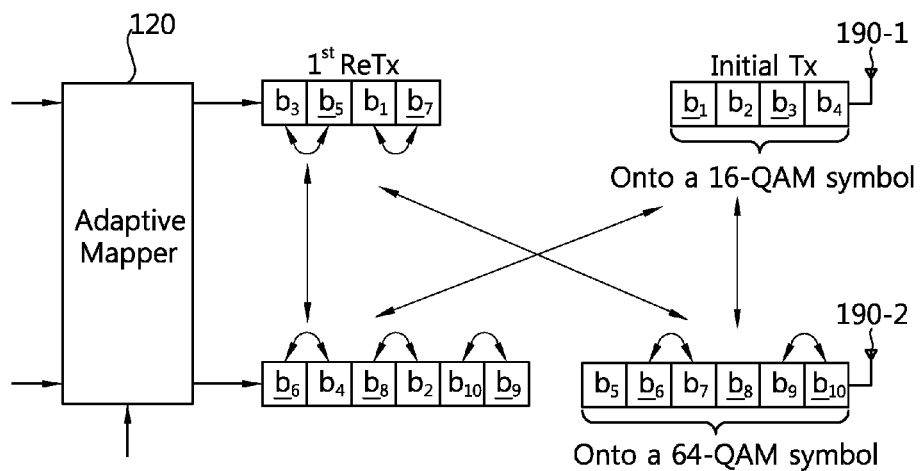
FIG. 2 shows an example of an operation of an adaptive mapper for multi-modulation transmission in case of using two transmit antennas.

FIG. 2 shows an example of an operation of an adaptive mapper for multi-modulation transmission in case of using two transmit antennas.

Referring to FIG. 2, the 1st transmit antenna 190-1 uses 16-QAM and the 2nd transmit antenna 190-2 uses 64-QAM. In initial transmission, four bits constitute one data symbol in the 1st transmit antenna 190-1, and six bits constitute one data symbol in the 2nd transmit antenna 190-2. Data symbols for initial transmission in the 1st transmit antenna 190-1 are expressed by $\{b_1, b_2, b_3, b_4\}$. Data symbols for initial transmission in the 2nd transmit antenna 190-2 are expressed by $\{b_5, b_6, b_7, b_8, b_9, b_{10}\}$. When an error occurs according to a channel condition, data symbols transmitted from the respective transmit antennas are retransmitted. The adaptive mapper 120 configures bits constituting a retransmission symbol for each antenna by performing swapping or inversion of each bit on a signal constellation of the symbol in comparison with initial transmission. Unlike the initial transmission, in retransmission, the 1st transmit antenna 190-1 uses 64-QAM and the 2nd transmit antenna 190-2 uses 16-QAM.

According to this example, in retransmission, data symbols of the 1st transmit antenna 190-1 are remapped to $\{b_3, \underline{b}_5, b_1, \underline{b}_7\}$, and data symbols of the 2nd transmit antenna 190-2 are remapped to $\{\underline{b}_6, b_4, \underline{b}_8, b_2, b_{10}, \underline{b}_9\}$. The underline means a bit inversion operation.

Figure 3:
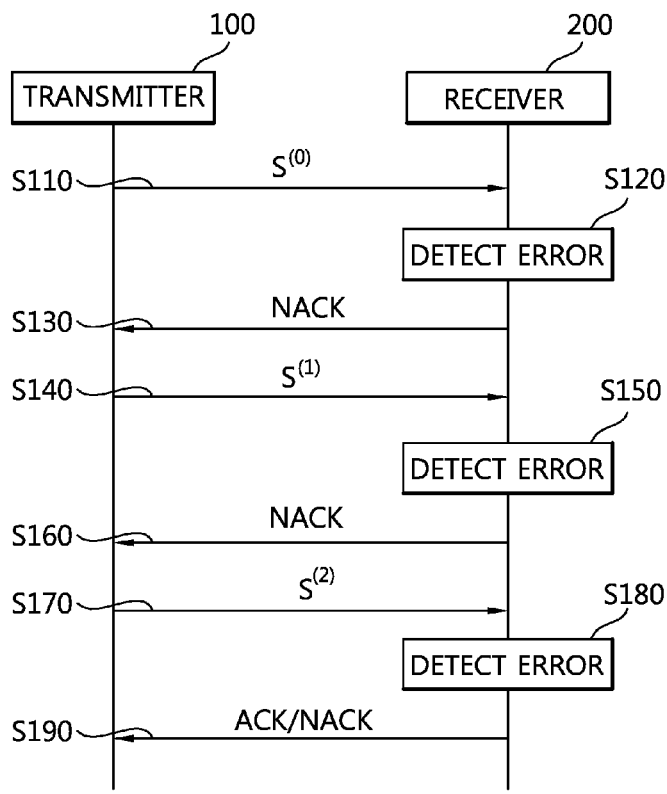
FIG. 3 is a flow diagram showing a data transmission method using a wireless communication system of FIG. 1.

FIG. 3 is a flow diagram showing a data transmission method using the wireless communication system of FIG. 1.

Referring to FIG. 3, the transmitter 100 transmits a transmission (Tx) block $S^{(0)}$ (step S110). The Tx block is formed in an $Nt \times 2B_{max}$ matrix format, and is a data block mapped onto a signal constellation by the adaptive mapper 120. Nt denotes the number of transmit antennas. $2B_{max}$ denotes the number of index bits for a modulation scheme having a highest order among modulation schemes used in multi-modulation transmission. If a maximum modulation order is M-QAM, $2B_{max}$ is $\log_2 M$. For example, $2B_{max}$ is 4 in 16-QAM. The Tx block expressed in a mathematical form consists of a predetermined number of rows, wherein the predetermined number is equal to the number of transmit antennas. Each row is transmitted through one transmit antenna. Bits constituting one row represent bits of one data symbol. In one Tx block, the data symbol is modulated using at least two modulation schemes.

The superscript of the Tx block S denotes the number of retransmissions. For example, $S^{(0)}$ denotes a Tx block for initial transmission, and $S^{(1)}$ denotes a Tx block for 1st retransmission.

The receiver 200 detects an error from the received Tx block $S^{(0)}$ (step S120). If no error is detected, the receiver 200 transmits an ACK signal to the transmitter 100, and waits for transmission of a next Tx block. However, it will be assumed herein that the receiver 200 detects the error and thus transmits a NACK signal as a retransmission request signal (step S130).

Upon receiving the NACK signal, the transmitter 100 transmits a retransmitted Tx (ReTx) block $S^{(1)}$ (step S140). Upon receiving the NACK signal, the controller 150 controls the adaptive mapper 120 to remap the Tx block $S_{(0)}$ in a bitwise manner and/or in a spatial manner, and thus configures the ReTx block $S^{(1)}$. Various schemes can be used as a remapping scheme used in retransmission, which will be described below.

The receiver 200 detects an error from the received ReTx block $S^{(1)}$ (step S150). In this case, the combination unit 240 can combine the previous Tx block $S^{(0)}$ and the ReTx block $S^{(1)}$.

If no error is detected, the receiver 200 transmits an ACK signal to the transmitter 100, and waits for transmission of a next symbol. However, it will be assumed herein that the receiver 200 detects the error and thus transmits a NACK signal as a retransmission request signal (step S160).

Upon receiving the NACK signal, the transmitter 100 transmits a remapped ReTx block $S^{(2)}$ (step S170). The adaptive mapper 120 remaps the Tx block $S^{(0)}$ in a bitwise manner and/or in a spatial manner, and thus configures the ReTx block $S^{(2)}$.

The receiver 200 detects an error from the received ReTx block $S^{(2)}$ (step S180). The receiver 200 transmits an ACK signal or a NACK signal to the transmitter 100 according to an error detection result (step S190). When the ACK signal is transmitted, retransmission for a corresponding Tx block is finished. A retransmission request in response to the NACK signal can be repeated up to a predetermined number M of times, where M is an iteration number greater than 0 (i.e., M≥1). If errors are continuously detected even after M-th retransmission is performed, a retransmission process can be reset and then a next Tx block can start to be transmitted. Alternatively, transmission of a current Tx block may be resumed.

Figures 4, 5:
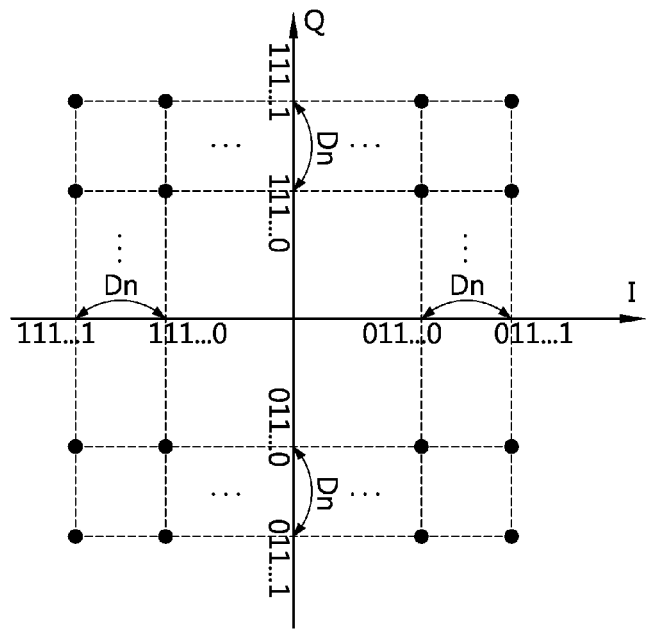
FIG. 4 shows a transmission block in case of using multiple antennas.
FIG. 5 shows a signal constellation of an M-ary quadrature amplitude modulation (M-QAM) scheme.

FIG. 4 shows a Tx block in case of using multiple antennas.

Referring to FIG. 4, $T_0$ denotes initial transmission, $T_1$ denotes 2nd transmission, that is, 1st retransmission, and $T_m$ denotes (m+1)th transmission, that is, m-th retransmission. $S^{(0)}$ denotes a Tx block for initial transmission. $S^{(1)}$ denotes a Tx block for 1st retransmission. $S^{(m)}$ denotes a Tx block for m-th retransmission.

If different modulation schemes are used by the respective transmit antennas, and if $2B_n$ denotes the number of index bits for a modulation scheme of an n-th transmit antenna, then an n-th row $s^{(0)}_n$ constituting the Tx block $S^{(0)}$ can be expressed with bits indicating an in-phase (I)-axis and a quadrature (Q)-axis as shown:

MathFigure 1

$$s_n^{(0)} = [i_{n,1} \cdots i_{n,B_n} q_{n,1} \cdots q_{n,B_n}] \qquad \text{[Math.1]}$$

where i and q respectively denote bits indicating the I-axis and the Q-axis on the signal constellation. The positions of the I-axis and the Q-axis are not absolute positions. That is, if one axis on the signal constellation is referred to as the I-axis, the other axis is referred to as the Q-axis.

Thus, the Tx block $S^{(0)}$ can be expressed as follows:

MathFigure 2

$$S^{(0)} = [\, I^{(0)} \quad Q^{(0)} \,] = \begin{bmatrix} i_{1,1} & \cdots & i_{1,B_1} & x & x & q_{1,1} & \cdots & q_{1,B_1} & x & x \\ i_{2,1} & i_{2,2} & \cdots & i_{1,B_2} & x & q_{2,1} & q_{2,2} & \cdots & q_{1,B_2} & x \\ \vdots & \vdots & \vdots & \vdots & x & \vdots & \vdots & \vdots & \vdots & x \\ i_{Nt,1} & i_{Nt,2} & i_{Nt,3} & \cdots & i_{Nt,B_{max}} & q_{Nt,1} & q_{Nt,2} & q_{Nt,3} & \cdots & q_{Nt,B_{max}} \end{bmatrix} \qquad \text{[Math. 2]}$$

where Nt denotes the number of transmit antennas, and x denotes an empty element which indicates that no value exists in a corresponding location. Likewise, retransmission blocks $S^{(1)}, \ldots, S^{(m)}$ can be expressed with an $Nt \times 2B_{max}$ matrix.

In a case where the respective transmit antennas use different modulation schemes or the same modulation scheme, the retransmission blocks $S^{(1)}, \ldots, S^{(m)}$ are searched for, wherein bit swapping and inversion are performed on these blocks to reduce a bit error probability in each retransmission.

A link performance gain can be obtained in a retransmission method based on the adaptive mapper for the following two reasons. First, a position of each bit has an unequal bit importance due to a QAM characteristic. When diversity can be obtained by varying mapping of the signal constellation, the diversity is called mapping diversity. The mapping diversity is obtained by performing swapping of bits constituting a data symbol or by performing bit inversion when retransmission is made. Second, spatial diversity can be obtained by shuffling transmit antennas when retransmission is made using multiple antennas.

Bit swapping and inversion (BSI) denotes horizontal rearrangement for obtaining the mapping diversity. Bit shuffling between antennas (BSA) denotes vertical rearrangement for obtaining the spatial diversity. If all transmit antennas use the same modulation scheme, bit mappings obtained using the BSI and the BSA are independent from each other. On the other hand, if each transmit antenna uses a different modulation scheme, the obtained bit mappings are not completely independent since swapping between bits located in different rows has to be considered using the BSI.

There is a need for a mapping scheme capable of optimizing the bit error probability and the spatial diversity.

FIG. 5 shows a signal constellation of an M-QAM scheme. It is assumed that the location of signal constellation conforms to general gray mapping.

Referring to FIG. 5, if $M_n$-QAM denotes a modulation scheme used in an n-th transmit antenna, a total of $M_n$ signal constellations exist, and the number of index bits for each modulation scheme is $2B_n = \log_2 M_n$.

From the perspective of the I-axis, if $D_n$ denotes a minimum distance between positions on the signal constellation, a position I(c) of an arbitrary Tx signal c in one axis can be expressed by Equation 3 below.

MathFigure 3

$$I(c) = \frac{-(\sqrt{M_n} + 1 - 2i)D_n}{2}, i = 1, 2, \ldots, \sqrt{M_n} \quad [\text{Math. 3}]$$

From the perspective of the I-axis, A(c) denotes a priori probability in an arbitrary Tx signal c. The Tx signal is c=($i_{n,1}$, $i_{n,2}$, $i_{n,3}$, ..., $i_{n,Bn}$). In addition, $i_{n,1}$ denotes a most significant bit (MSB), and $i_{n,Bn}$ denotes a least significant bit (LSB). If $y_n$ denotes a reception (Rx) signal, a log-likelihood ratio (LLR) of a bit $i_{n,b}$ can be expressed by Equation 4 below.

MathFigure 4

$$LLR(i_{n,b} | y_n) = \log\left\{\frac{\sum_{c \in \{i_{n,b}=1\}} A(c) \cdot P(y_n | I(c))}{\sum_{c \in \{i_{n,b}=0\}} A(c) \cdot P(y_n | I(c))}\right\} \approx \quad [\text{Math. 4}]$$

$$\frac{2 \cdot y_n \cdot (I_{min,1}(c) - I_{min,0}(c)) + (I_{min,0}(c)^2 - I_{min,1}(c)^2)}{N_0},$$

where $I_{min,x}(c) = \underset{I(c)}{\operatorname{argmin}}(y_n - I(c \in \{i_{n,b} = x\}))$ An Rx signal $z_n$ denotes a signal received from an n-th antenna and completely restored using a MIMO equalizer. If it is assumed that the Rx signal $z_n$ creates an Rx signal $y_n$ by removing channel information $h_n$ through a zero-forcing (ZF) equalizer, the Rx signal $y_n$ can be expressed as shown:

MathFigure 5

$$y_n = x_n + n' \quad [\text{Math. 5}]$$

where x denotes a Tx signal. n' denotes an increased noise generated when passing the ZF equalizer, and has a normal distribution of N(0, $N_0/(2|h_0|^2)$).

According to Equations 4 and 5, an average and dispersion of a received LLR value can be calculated as follows.

MathFigure 6

$$E[LLR(i_{n,b} | y_n)] \approx \frac{2 \cdot E[x_n] \cdot (I_{min,1}(c) - I_{min,0}(c)) + (I_{min,0}(c)^2 - I_{min,1}(c)^2)}{N_0/|h_n|^2}, \quad [\text{Math. 6}]$$

$$V[LLR(i_{n,b} | y_n)] \approx \left(\frac{2 \cdot (I_{min,1}(c) - I_{min,0}(c))}{N_0/|h_n|^2}\right)^2 \cdot \frac{N_0}{2|h_n|^2}$$

If it is assumed that LLR values are calculated by performing MIMO combining with a bit unit in every retransmission, the LLR values are summed until rth retransmission is performed. The obtained sum of LLR values can be expressed by the following equation.

MathFigure 7

$$LLR^{(comb)}(i_{n,b} | y_n) = \sum_{l=0}^{r} LLR^{(l)}(i_{n,b} | y_n), \quad [\text{Math. 7}]$$

$$b = 1, 2, \ldots, B_n$$

By using a Q-function and a Chernoff bound, a bit error rate (BER) value of individual transmission bits constituting each data symbol can be expressed by the following equation.

MathFigure 8

$$P^{(r)}_{n,b|c} = Q\left(\frac{|E[LLR^{(comb)}(i_{n,b} | y_n)]|}{\sqrt{V[LLR^{(comb)}(i_{n,b} | y_n)]}}\right) = \quad [\text{Math. 8}]$$

$$Q\left(\frac{\sum_{l=0}^{r} |E[LLR^{(l)}(i_{n,b} | y_n)]|}{\sqrt{\sum_{l=0}^{r} V[LLR^{(l)}(i_{n,b} | y_n)]}}\right) \leq$$

$$\frac{1}{2}\exp\left\{-\frac{1}{2} \cdot \frac{\left(\sum_{l=0}^{r} |E[LLR^{(l)}(i_{n,b} | y_n)]|\right)^2}{\sum_{l=0}^{r} V[LLR^{(l)}(i_{n,b} | y_n)]}\right\} =$$

$$\frac{1}{2}\exp\left\{-\frac{1}{2} \cdot R^{(r)}_{n,b|c}\right\}$$

Herein, $R^{(r)}_{n,b|c}$ denotes a ratio of an average and a dispersion of the summed LLR values expressed in a last part of Equation 8, and is defined as a conditional bit reliability of a bit $i_{n,b}$. The term "conditional" means that the bit reliability is at a time when a Tx signal (i.e., data symbol) c is transmitted. By averaging conditional bit reliabilities for all possible data symbols, an average bit reliability can be obtained by the following equation.

MathFigure 9

$$R^{(r)}_{n,b} = \frac{1}{\sqrt{M_n}} \sum_c R^{(r)}_{n,b|c} \quad [\text{Math. 9}]$$

According to Equation 9, the conditional bit reliability and the average bit reliability depending on a transmission bit of the M-QAM can be obtained.

Table 1 shows the average bit reliability in the I-axis of 16-QAM when initial transmission is performed. Herein, $D^2_n = E^2_s/10$.

TABLE 1

| c | I(c) | $R^{(r)}_{n,1|c}$ | $R^{(r)}_{n,2|c}$ |
|---|---|---|---|
| 00 | $-3D_n/2$ | $2 \cdot \frac{D^2_n |h_n|^2}{N_0}$ | $\frac{1}{2} \cdot \frac{D^2_n |h_n|^2}{N_0}$ |
| 01 | $-D_n/2$ | $\frac{1}{2} \cdot \frac{D^2_n |h_n|^2}{N_0}$ | $\frac{1}{2} \cdot \frac{D^2_n |h_n|^2}{N_0}$ |
| 10 | $3D_n/2$ | $2 \cdot \frac{D^2_n |h_n|^2}{N_0}$ | $\frac{1}{2} \cdot \frac{D^2_n |h_n|^2}{N_0}$ |
| 11 | $D_n/2$ | $\frac{1}{2} \cdot \frac{D^2_n |h_n|^2}{N_0}$ | $\frac{1}{2} \cdot \frac{D^2_n |h_n|^2}{N_0}$ |
| $R^{(r)}_{n,b}$ | N/A | $1.25 \cdot \frac{D^2_n |h_n|^2}{N_0}$ | $\frac{1}{2} \cdot \frac{D^2_n |h_n|^2}{N_0}$ |

Table 2 shows the average bit reliability in the I-axis of 64-QAM when initial transmission is performed. Herein, $D^2_n = E^2_s/84$.

TABLE 2

| c | I(c) | $R_{n,1|c}^{(r)}$ | $R_{n,2|c}^{(r)}$ | $R_{n,3|c}^{(r)}$ |
|---|---|---|---|---|
| 000 | $-7D_n/2$ | $8 \cdot \frac{D_n^2 |h_n|^2}{N_0}$ | $2 \cdot \frac{D_n^2 |h_n|^2}{N_0}$ | $\frac{1}{2} \cdot \frac{D_n^2 |h_n|^2}{N_0}$ |
| 001 | $-5D_n/2$ | $4.5 \cdot \frac{D_n^2 |h_n|^2}{N_0}$ | $\frac{1}{2} \cdot \frac{D_n^2 |h_n|^2}{N_0}$ | $\frac{1}{2} \cdot \frac{D_n^2 |h_n|^2}{N_0}$ |
| 010 | $-D_n/2$ | $\frac{1}{2} \cdot \frac{D_n^2 |h_n|^2}{N_0}$ | $2 \cdot \frac{D_n^2 |h_n|^2}{N_0}$ | $\frac{1}{2} \cdot \frac{D_n^2 |h_n|^2}{N_0}$ |
| 011 | $-3D_n/2$ | $2 \cdot \frac{D_n^2 |h_n|^2}{N_0}$ | $\frac{1}{2} \cdot \frac{D_n^2 |h_n|^2}{N_0}$ | $\frac{1}{2} \cdot \frac{D_n^2 |h_n|^2}{N_0}$ |
| 100 | $7D_n/2$ | $8 \cdot \frac{D_n^2 |h_n|^2}{N_0}$ | $2 \cdot \frac{D_n^2 |h_n|^2}{N_0}$ | $\frac{1}{2} \cdot \frac{D_n^2 |h_n|^2}{N_0}$ |
| 101 | $5D_n/2$ | $4.5 \cdot \frac{D_n^2 |h_n|^2}{N_0}$ | $\frac{1}{2} \cdot \frac{D_n^2 |h_n|^2}{N_0}$ | $\frac{1}{2} \cdot \frac{D_n^2 |h_n|^2}{N_0}$ |
| 110 | $D_n/2$ | $\frac{1}{2} \cdot \frac{D_n^2 |h_n|^2}{N_0}$ | $2 \cdot \frac{D_n^2 |h_n|^2}{N_0}$ | $\frac{1}{2} \cdot \frac{D_n^2 |h_n|^2}{N_0}$ |
| 111 | $3D_n/2$ | $2 \cdot \frac{D_n^2 |h_n|^2}{N_0}$ | $\frac{1}{2} \cdot \frac{D_n^2 |h_n|^2}{N_0}$ | $\frac{1}{2} \cdot \frac{D_n^2 |h_n|^2}{N_0}$ |
| $R_{n,b}^{(r)}$ | N/A | $3.75 \cdot \frac{D_n^2 |h_n|^2}{N_0}$ | $1.25 \cdot \frac{D_n^2 |h_n|^2}{N_0}$ | $\frac{1}{2} \cdot \frac{D_n^2 |h_n|^2}{N_0}$ |

As shown in Tables 1 and 2, the average bit reliability is higher in the MSB (i.e., $i_{n,1}$) than in the LSB (i.e., $i_{n,2}$). This implies that more bit errors can be resulted when the n,2 same information is transmitted through an LSB position than when the same information is transmitted through an MSB position. Therefore, if a bit transmitted through the LSB in initial transmission can be transmitted through the MSB in retransmission, reliability of an overall link performance can be increased.

Comparing Tables 1 and 2, the average bit reliability has a significant difference according to a modulation scheme. Therefore, the link performance can be more improved when bit swapping is performed between data symbols using different modulation schemes than when bit swapping is performed between data symbols using one modulation scheme in every retransmission. Swapping is defined as positional changes between bits.

Since all antennas use the same modulation scheme in single-modulation transmission, data symbols for all transmit antennas have the same type of average bit reliability. Therefore, theoretically, the average bit reliability of all data symbols can be determined to be almost constant by performing several retransmissions. However, since data symbols for all transmit antennas have different types of average bit reliability in multi-modulation transmission, swapping has to be performed so that a difference of average bit reliability can be reduced as much as possible.

To quantize the difference of average bit reliability by performing bit swapping, a minimum squared error (MSE) is defined by the following equation.

MathFigure 10

$$\varepsilon^{(r)} = \sum_{n=1}^{N_t} \sum_{b=1}^{B_n} (R_{n,b}^{(r)} - E[R_{n,b}^{(r)}])^2 \qquad \text{[Math. 10]}$$

By minimizing the MSE of bit reliability defined in Equation 10, the difference of average reliability can be reduced in every retransmission. Each bit has the difference of average reliability in multi-modulation transmission.

In $R^{(r-1)}_{n,b}$ obtained by performing (r−1) retransmissions, a best swapping matrix I(r) is a matrix that satisfies the following equation.

MathFigure 11

$$I^{(r)} = \underset{\forall I^{(r)}}{\arg\min} \varepsilon^{(r)} \qquad \text{[Math. 11]}$$

If the number of transmit antennas and a modulation scheme used by each transmit antenna are predetermined, an average bit reliability to be added to an LLR value for each bit in every retransmission is predetermined. Therefore, when an average bit reliability for each bit is determined after performing (r−1) retransmissions, a bit having a lowest bit reliability is shifted to a position at which a highest bit reliability can be obtained in rth retransmission, and a bit having a highest bit reliability is shifted to a position at which a lowest bit reliability can be obtained in rth retransmission. Remaining bits are also shifted to positions having a high reliability in an ascending order of bit reliability. According to this method, conditions for minimizing the MSE of Equation 10 is satisfied in a state that an average bit reliability value summed in every transmission is determined for each transmit antenna and for each bit.

A minimum size of a bit swapping set according to the proposed method is defined as a first η satisfying $\varepsilon^{(\eta-1)} < \varepsilon^{(\eta)}$.

For example, it is assumed that a 1st data symbol modulated with 16-QAM is transmitted through a 1st transmit antenna, and a 2nd data symbol modulated with 64-QAM is transmitted through a 2nd transmit antenna.

FIG. 6 is a graph showing changes in an MSE of average bit reliability with respect to the number of retransmissions according to the proposed bit swapping scheme. The graph shows changes of $\varepsilon^{(r)}$ that is normalized to $\varepsilon^{(0)}$ of initial transmission.

Referring to FIG. 6, according to the proposed bit swapping scheme, a difference of bit reliability can be reduced by half in 1st retransmission. In this case, a minimum size of the bit swapping set is 3. Therefore, the bit swapping set proposed in this example can be expressed by the following equation.

MathFigure 12

$$I^{(r)} \in \left\{ \begin{bmatrix} i_{1,1} & i_{1,2} & i_{1,3} \\ i_{2,1} & i_{2,2} & x \end{bmatrix}, \begin{bmatrix} i_{1,1} & i_{2,2} & i_{2,1} \\ i_{1,3} & i_{1,2} & x \end{bmatrix}, \begin{bmatrix} i_{1,1} & i_{1,3} & i_{2,1} \\ i_{1,2} & i_{2,2} & x \end{bmatrix} \right\} \qquad \text{[Math. 12]}$$

In each matrix, a first row represents 64-QAM transmission, and a second row represents 16-QAM transmission. A first element of the swapping set represents initial transmission. As shown in Tables 1 and 2 above, in case of 64-QAM and 16-QAM, an MSB of 16-QAM is positioned where a highest bit reliability can be obtained, followed by an LSB of 16-QAM, a middle bit of 64-QAM, and an LSB of 64-QAM, in that order. Therefore, a second matrix is configured such that an LSB of 64-QAM which has a lowest bit reliability in a first matrix is positioned to an MSB of 16-QAM, and a middle bit of 64-QAM is positioned to an LSB of 16-QAM. Accordingly, an MSE of average bit reliability is reduced. In a third matrix, bits are mapped by reverse-sorting according to the summed average bit reliability obtained by performing two retransmissions. Since the average bit reliability is sufficiently decreased after performing three retransmissions as shown in FIG. 6, the proposed bit mapping of Equation 12 is repeatedly used.

A method of reducing a difference of average bit reliability between bits by performing bit swapping is necessary to find a best BSI scheme. However, it is difficult to reduce a difference of conditional bit reliability between data symbols when only bit swapping is used.

To reduce the difference of conditional bit reliability, it is necessary to perform an inversion operation in retransmission. In a case where (1,0) and (1,1) of Table 1 are transmitted, if an LSB is inversely mapped in transmission, a receiver receives (1,1) and (1,0) having an opposite LLR value. When using single modulation transmission, since an MSB of 16-QAM has a total of two absolute values for different LLR values, an absolute value difference of LLR between data symbols can be reduced when transmission is made by performing the inversion operation one time for initial transmission. However, when using multi-modulation transmission, rows of a Tx block are configured to have different sizes. Bit inversion for an nth antenna whose row is less than $B_{max}$ has to be repetitively performed. Bit inversion on an n-th row of the Tx block can be expressed by the following equation.

MathFigure 13

$$I^{(r)}(n,:) \in \begin{Bmatrix} [i_{n,1} \ \overline{i_{n,2}} \ i_{n,3} \ \cdots \ i_{n,B_n}] \\ [i_{n,1} \ i_{n,2} \ \overline{i_{n,3}} \ \cdots \ i_{n,B_n}] \\ \vdots \\ [i_{n,1} \ \overline{i_{n,2}} \ \overline{i_{n,3}} \ \cdots \ \overline{i_{n,B_n}}] \\ \vdots \\ [i_{n,1} \ \overline{i_{n,2}} \ i_{n,3} \ \cdots \ i_{n,B_n}] \\ [i_{n,1} \ i_{n,2} \ \overline{i_{n,3}} \ \cdots \ i_{n,B_n}] \\ \vdots \\ [i_{n,1} \ \overline{i_{n,2}} \ \overline{i_{n,3}} \ \cdots \ \overline{i_{n,B_n}}] \end{Bmatrix} \quad [\text{Math. 13}]$$

In the above equation, $I^{(r)}(n,:)$ denotes an nth row of $I^{(r)}$. A size of the proposed inversion matrix is $2^{B_{max}-1}$. The number of times of repeating the inversion operation within $I^{(r)}(n,:)$ is $2^{B_{max}-B_n}$. According to the principal of the above inversion operation, the bit reliability exactly the same for all data symbols in multi-modulation transmission.

By combining bit swapping and bit inversion, combined bit reliabilities can be approximated with respect to all data symbols and all bit positions. Therefore, a BSI set size proposed in the present invention for multi-modulation transmission is $\eta 2^{B_{max}-1}$.

FIG. 7 shows a BSI scheme in a 2×2 MIMO system using 16-QAM and 64-QAM according to an embodiment of the present invention. Herein, Equations 12 and 13 are used in combination by the 2×2 MIMO system using 16-QAM and 64-QAM.

Referring to FIG. 7, three Tx blocks are obtained by performing bit swapping according to Equation 12 above. If the three Tx blocks are extended by performing an inversion operation, a total of 12 BSI sets are obtained. A total of four Tx blocks are configured by performing the inversion operation with respect to a 1st transmit antenna using 64-QAM. Four Tx blocks are configured by repeatedly performing an inversion and non-inversion operation two times on a second bit with respect to a 2nd transmit antenna using 16-QAM whose modulation order is lower than that of 64-QAM. A difference of average bit reliability can be significantly reduced using the inversion operation.

Now, optimization of the BSA scheme in multi-modulation transmission will be described.

In a diversity transmission scheme used in a conventional MIMO system, the same data symbol is transmitted to a plurality of transmit antennas to obtain spatial diversity, and the same data symbol is repeatedly transmitted at different time to obtain time diversity. In the HARQ scheme, a time difference between retransmissions is several millisecond (ms) unit, which is significantly greater than a symbol unit. Thus, a channel condition is significantly different between retransmissions. Accordingly, when retransmission is considered, a higher diversity gain can be obtained using the spatial diversity in which a transmit antenna is changed for each bit.

FIG. 8 shows an example of a BSA scheme in single modulation transmission.

Referring to FIG. 8, transmission is achieved by applying different shift amounts to respective columns so that bits constituting one data symbol are transmitted respectively through different antennas in every retransmission. Applying different shift amounts to respective columns of a Tx block is called multi-step cyclic shift (MSCS). A maximum diversity gain can be expected through the MSCS.

Since respective bits constituting one data symbol can be transmitted through different transmit antennas, if the number B of bits constituting one I-axis or Q-axis symbol is greater than the number Nt of transmit antennas, up to B additional diversities can be obtained.

The MSCS can be expressed with the aforementioned matrix expression according to the following equation.

MathFigure 14

$$I^{(1)} = f_{MSCS}(I^{(0)}) \quad [\text{Math.14}]$$

In case of performing two or more retransmissions, a time difference between retransmissions is relatively large, and thus it can be regarded that a channel response is independent between retransmissions. Therefore, it can be regarded that immediately previous BSA does not have an effect in determining of BSA in every retransmission. Accordingly, BSA for 2nd or higher retransmission as shown Equation 15 can also directly use an optimal BSA scheme of Equation 14 irrespective of previous BSA.

MathFigure 15

$$I^{(r)} = f_{MSCS}(I^{(r-1)}), r=1,2,\ldots,r_{max} \quad [\text{Math.15}]$$

In multi-modulation transmission, the BSA in the aforementioned single modulation transmission can be extended in the similar manner. It is desired to use MSCS-based BSA since the purpose of using the multi-modulation transmission is to obtain a high spatial diversity by transmitting bits constituting one data symbol through different transmit antennas. However, since the number of bits constituting each row of a Tx block is different unlike in the single modulation transmission, a group MSCS (GMSCS) scheme is proposed.

According to the GMSCS scheme, vertical swapping of bits through MSCS is performed only between rows having the same number of bits. If a given matrix is divided into an inter-row permutation matrix $P_{row}$ and a depermutation matrix $D_{row}$, an operation of GMSCS can be mathematically expressed as follows.

MathFigure 16

$$I^{(r)} = f_{GMSCS}(I^{(r-1)} \cdot P_{row}) \cdot D_{row} \quad [\text{Math. 16}]$$

$$= f_{GMSCS}\left(\begin{bmatrix} I_2^{(r-1)} \\ I_3^{(r-1)} \\ \vdots \\ I_{B_{max}}^{(r-1)} \end{bmatrix}\right) \cdot D_{row}$$

$$= \begin{bmatrix} f_{MSCS}(I_2^{(r-1)}) \\ f_{MSCS}(I_3^{(r-1)}) \\ \vdots \\ f_{MSCS}(I_{B_{max}}^{(r-1)}) \end{bmatrix} \cdot D_{row}, r = 1, 2, \ldots, r_{max}$$

Herein, $I^{(r-1)}_m$ denotes a matrix which is newly created by collecting rows having m bits. The operation of BSA can maintain independency from the operation of BSI. That is, an LLR value equally adjusted by the BSI scheme is not changed.

FIG. 9 shows a BSA scheme in a 5×5 MIMO system using 16-QAM and 64-QAM according to an embodiment of the present invention.

Referring to FIG. 9, 1st, 3rd, and 5th transmit antennas use 64-QAM, and 2nd and 4th antennas use 16-QAM. Therefore, in initial transmission, a Tx block is expressed in a format of $I^{(0)}$.

A matrix $I^{(1)}$ is generated by an algorithm using GMSCS. When bit swapping is performed between 2nd and 4th transmit antennas using 16-QAM, a second bit of each row is swapped by 1-step cyclic shift. When bit swapping is performed between 1st, 3rd, and 5th transmit antennas using 64-QAM, a second bit is swapped by 1-step cyclic shift, and a third bit is swapped by 2-step cyclic shift. Matrixes $I^{(2)}, \ldots, I^{(r)}$ for two or more retransmissions can also be obtained using the same GMSCS algorithm.

Figure 10:
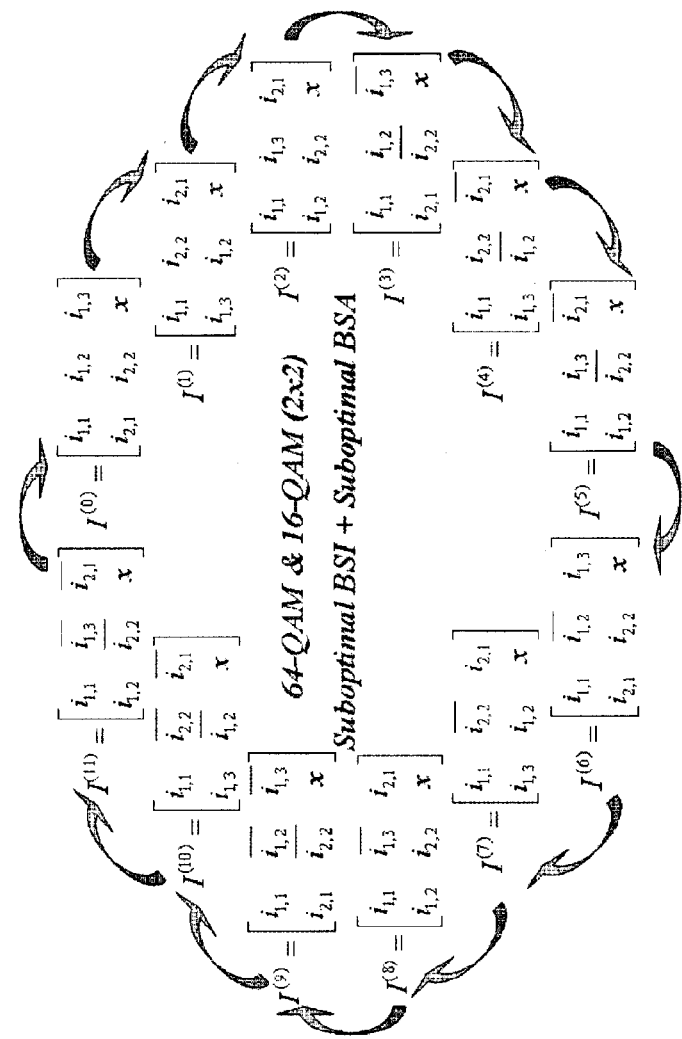
FIG. 10 shows an example of applying a BSI scheme and a BSA scheme to a 2×2 MIMO system using 16-QAM and 64-QAM.

FIG. 10 shows an example of applying a BSI scheme and a BSA scheme to a 2×2 MIMO system using 16-QAM and 64-QAM. A combination of the BSI and BSA schemes is used in multi-modulation transmission. In this example, the matrix set and the BSI scheme of FIG. 7 are applied. This is because while the proposed BSA scheme using GMSCS is applied between two or more transmit antennas using the same modulation scheme, the proposed BSA scheme is not applied in this example since there are only two transmit antennas using different modulation schemes.

The proposed scheme is applied for the number of arbitrary retransmissions, a combination of arbitrary m-QAM schemes, and the number of arbitrary transmit antennas.

Figure 11:
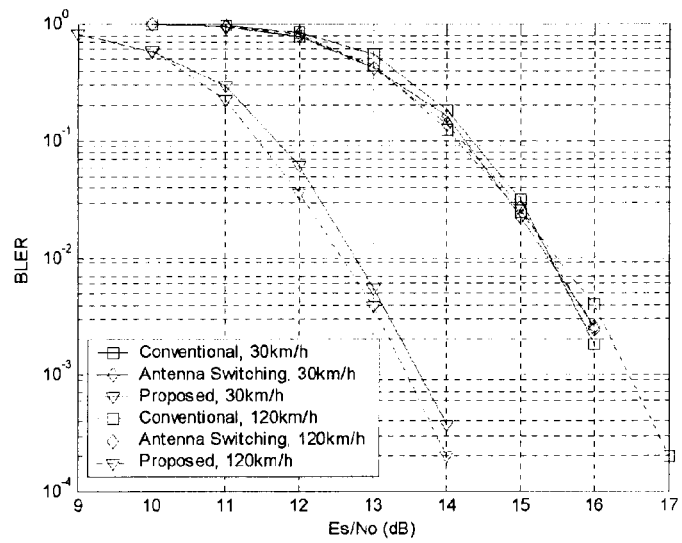
FIG. 11 is a graph showing a result obtained by performing simulations in a 2×2 MIMO system using 16-QAM and 64-QAM.

FIG. 11 is a graph showing a result obtained by performing simulations in a 2×2 MIMO system using 16-QAM and 64-QAM. The result of FIG. 11 is obtained by performing one retransmission with respect to the conventional method, an antenna switching method in which only BSA is performed in a symbol unit, and the proposed method. It is shown that a gain of about 3 dB can be obtained in the proposed method in comparison with the conventional method irrespective of a speed of a UE.

II. Constellation Rearrangement for MIMO Systems with HARQ

Spatial Multiplexing (SM) system using N transmit antenna and M receive antennas is considered. Suppose that the information bits are encoded with a coding rate of R by turbo code and L-coded bits are mapped into one of the complex constellation points out of the 2L-ary Quadrature Amplitude Modulation (QAM) symbols. The turbo code is used as exemplary purpose only, any well-known coding scheme such as convolution code, etc. may be used. Each symbol is modulated by Inverse Fast Fourier Transform (IFFT). In the transmitter, every N OFDM symbols can be transmitted through N transmit antennas at the same time.

From now on, we will analyze for 2L-QAM symbol in terms of unequal error probability over all of component bits. As known well, in square constellation such as $2^L$-QAM symbol, there exist symmetries between In-phase and Quadrature components. Therefore, in order to make analysis simpler, we just consider one dimension 4-PAM constellation for either In-phase or Quadrature component of 16-QAM.

Figure 12:
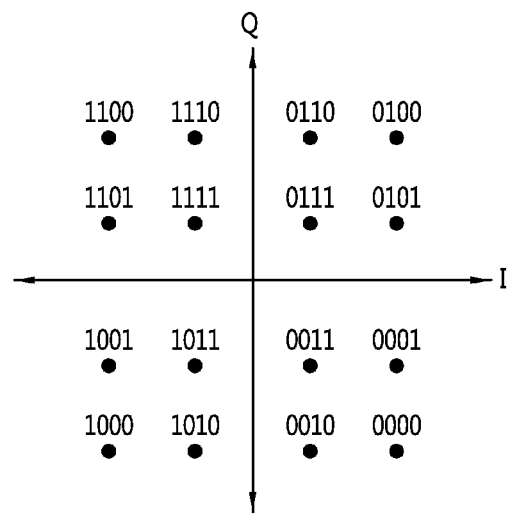
FIG. 12 shows gray mapping for 16-QAM.
Figure 13:
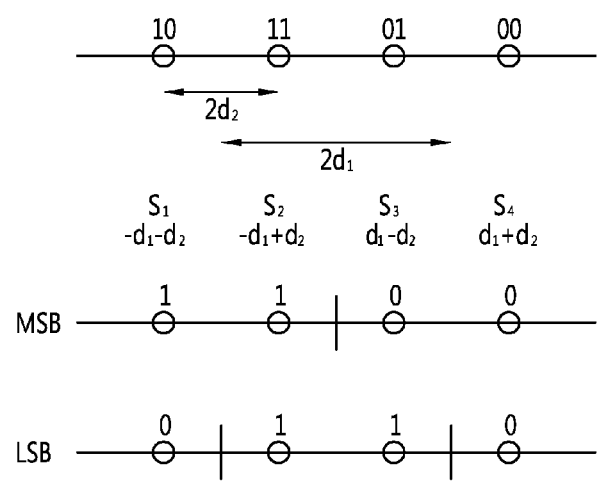
FIG. 13 shows decision boundary to calculate a bit error probability.

FIG. 12 shows Gray mapping for 16-QAM and FIG. 13 shows decision boundary to calculate the probability of bit error. It is assumed that 16-QAM is modulated by gray mapping and 4-PAM constellation for Most Significant Bit (MSB) and Least Significant Bit (LSB) to calculate the probability of bit error on each component bit is subject to one dimension, either In-phase or Quadrature. All possible 4-PAM symbols are $s_1, s_2, s_3$ and $s_4$. Also these symbols are located at $-d_1-d_2$, $-d_1+d_2$, $d_1-d_2$ and $d_1+d_2$, respectively, in which $2d_1$ means the distance between two decision boundary within 4-PAM constellation for LSB and $2d_2$ represents the distance between two neighboring symbols within the 4-PAM constellation.

The probability of bit error for MSB, which is the probability of bit error when s1 symbol (i.e. 10) is transmitted, can be expressed as shown:

MathFigure 17

$$P_e = P\left\{\langle n, \varphi \rangle \geq \frac{d}{2} = \frac{2(d_1 + d_2)}{2}\right\} \quad [\text{Math. 17}]$$

$$= \int_{d_1+d_2}^{\infty} \frac{1}{\sqrt{2\pi\sigma_n^2}} e^{-\frac{1}{2\sigma_n^2}u^2} du$$

$$= \int_{\frac{d_1+d_2}{\sigma_n^2}}^{\infty} \frac{1}{\sqrt{2\pi}} e^{-\frac{1}{2}u^2} du = Q\left(\frac{d_1+d_2}{\sigma_n^2}\right)$$

where n means white Gaussian noise with variance $\sigma^2_n$, and $\psi$ is a unit norm vector along the line between $s_1$ and $s_4$. <x, y> represents the inner product between x and y. The probability of bit error can be defined as the probability that the component of the noise vector n along the line connecting between the two associated symbols is greater than half the distance along this line. The error probability of $s_4$ is the same as that of $s_1$. In the same way, when $s_2$ and $s_3$ is transmitted, the probability of bit error is given as shown below.

MathFigure 18

$$Q\left(\frac{d_1-d_2}{\sigma_n}\right) \quad [\text{Math. 18}]$$

Thus, the average probability of bit error for MSB can be obtained as shown:

MathFigure 19

$$P_e = P_{e|s_1} p(s_1) + P_{e|s_2} p(s_2) + P_{e|s_3} p(s_3) + P_{e|s_4} p(s_4) \quad [\text{Math. 19}]$$

$$= \frac{1}{4} Q\left(\frac{d_1+d_2}{\sigma_n}\right) + \frac{1}{4} Q\left(\frac{d_1-d_2}{\sigma_n}\right) + \frac{1}{4} Q\left(\frac{d_1-d_2}{\sigma_n}\right) +$$

$$\frac{1}{4} Q\left(\frac{d_1+d_2}{\sigma_n}\right)$$

where $p(s_i)$ represents the priori probability of $s_i$ and $P_{e|si}$ is the probability of bit error when $s_i$ is transmitted to the receiver. For the second, the probability for LSB as well as the way to obtain the probability of bit error for MSB can be calculated. The probability of bit error for LSB is thereby given as shown below.

MathFigure 20

$$\frac{1}{4}\left(Q\left(\frac{d_2}{\sigma_n}\right) - Q\left(\frac{2d_1 + d_2}{\sigma_n}\right)\right) + \frac{1}{4}\left(Q\left(\frac{d_2}{\sigma_n}\right) + Q\left(\frac{2d_1 - d_2}{\sigma_n}\right)\right) + \frac{1}{4}\left(Q\left(\frac{d_2}{\sigma_n}\right) + Q\left(\frac{2d_1 - d_2}{\sigma_n}\right)\right) + \frac{1}{4}\left(Q\left(\frac{d_2}{\sigma_n}\right) - Q\left(\frac{2d_1 + d_2}{\sigma_n}\right)\right)$$

[Math. 20]

Now, it can be known from Equations 19 and 20 that the component bits in either In-phase or Quadrature have the different probability of bit error. The difference of probability of bit error between all possible candidate bits to be either MSB or LSB can be also observed. Furthermore, when the probability of bit error is calculated, because there are two decision boundaries for LSB, the decision boundary is easy to be influenced by the wrong information from the other side as shown in Equation 20.

Also, let $dd_1=2d_2=2d$, we can approximate Equation 19 as follows.

MathFigure 21

$$\frac{1}{4}Q\left(\frac{3d}{\sigma_n}\right) + \frac{1}{4}Q\left(\frac{d}{\sigma_n}\right) + \frac{1}{4}Q\left(\frac{d}{\sigma_n}\right) + \frac{1}{4}Q\left(\frac{3d}{\sigma_n}\right)$$

[Math. 21]

Similarly, assuming that the effect from the other decision boundary can be ignored, the probability of bit error for LSB can be represented as shown below.

MathFigure 22

$$\frac{1}{4}Q\left(\frac{d}{\sigma_n}\right) + \frac{1}{4}Q\left(\frac{d}{\sigma_n}\right) + \frac{1}{4}Q\left(\frac{d}{\sigma_n}\right) + \frac{1}{4}Q\left(\frac{d}{\sigma_n}\right)$$

[Math. 22]

For HARQ-Chase Combing (CC), it is assumed that the probability of bit error for the case that the current Log Likelihood Ratio (LLR) values and the previous LLR values are combined in a demapper. According to the type of channel environment, the probability of error for HARQ-CC into three sorts can be divided as follows.

a) Additive White Gaussian Noise (AWGN) Channel:

MathFigure 23

$$Q\left(\sqrt{\frac{1}{2\sigma_n^2} \sum_{i=1}^{M} |d_i|^2}\right)$$

[Math. 23]

where $d_i$ denotes a Euclidean distance at i-th retransmission, and M means the maximum number of retransmissions.

b) Fading Channel with Incoherent Demodulation:

MathFigure 24

$$Q\left(\sqrt{\frac{1}{2\sigma_n^2} \sum_{i=1}^{M} |h_i|^2 |d_i|^2}\right)$$

[Math. 24]

where $h_i$ means the channel value at i-th retransmission. For a receiver with the incoherent demodulation, the probability of error of HARQ-CC in fading channel environment is given by Equation 24.

c) Fading Channel with Coherent Demodulation:

MathFigure 25

$$Q\left(\sqrt{\frac{1}{2\sigma_n^2} \sum_{i=1}^{M} [|\text{Re}\{h_i\}|^2 |\text{Re}\{d_i\}|^2 + |\text{Im}\{h_i\}|^2 |\text{Im}\{d_i\}|^2]}\right)$$

[Math. 25]

The probability of error for HARQ-CC in fading channel environment with coherent demodulation is given by Equation 25.

Therefore, we consider both the probability of error for HARQ-CC and the probability of bit error for MSB and LSB in the course of chase combining as shown in Table 3.

TABLE 3

| component bits | Initial Transmission | | Retransmission (CC) | |
|---|---|---|---|---|
| | MSB | LSB | MSB | LSB |
| 10 | $\frac{1}{4}Q\left(\frac{3d}{\sigma_n^2}\right)$ | $\frac{1}{4}Q\left(\frac{d}{\sigma_n^2}\right)$ | $\frac{1}{4}Q\left(\frac{3\sqrt{2}\,d}{\sigma_n}\right)$ | $\frac{1}{4}Q\left(\frac{\sqrt{2}\,d}{\sigma_n^2}\right)$ |
| 11 | $\frac{1}{4}Q\left(\frac{d}{\sigma_n^2}\right)$ | $\frac{1}{4}Q\left(\frac{d}{\sigma_n^2}\right)$ | $\frac{1}{4}Q\left(\frac{\sqrt{2}\,d}{\sigma_n}\right)$ | $\frac{1}{4}Q\left(\frac{\sqrt{2}\,d}{\sigma_n^2}\right)$ |
| 01 | $\frac{1}{4}Q\left(\frac{d}{\sigma_n^2}\right)$ | $\frac{1}{4}Q\left(\frac{d}{\sigma_n^2}\right)$ | $\frac{1}{4}Q\left(\frac{\sqrt{2}\,d}{\sigma_n}\right)$ | $\frac{1}{4}Q\left(\frac{\sqrt{2}\,d}{\sigma_n^2}\right)$ |
| 00 | $\frac{1}{4}Q\left(\frac{3d}{\sigma_n^2}\right)$ | $\frac{1}{4}Q\left(\frac{d}{\sigma_n^2}\right)$ | $\frac{1}{4}Q\left(\frac{3\sqrt{2}\,d}{\sigma_n}\right)$ | $\frac{1}{4}Q\left(\frac{\sqrt{2}\,d}{\sigma_n^2}\right)$ |
| Average | $\frac{1}{2}Q\left(\frac{3d}{\sigma_n^2}\right) + \frac{1}{2}Q\left(\frac{d}{\sigma_n^2}\right)$ | $Q\left(\frac{d}{\sigma_n^2}\right)$ | $\frac{1}{2}Q\left(\frac{3\sqrt{2}\,d}{\sigma_n}\right) + \frac{1}{2}Q\left(\frac{\sqrt{2}\,d}{\sigma_n}\right)$ | $Q\left(\frac{\sqrt{2}\,d}{\sigma_n^2}\right)$ |

Table 3 shows that the difference of bit error probability still exists during retransmission. Moreover, although a little improvement of Signal-to-Noise Ratio (SNR) can be obtained, the difference of bit error probability between MSB and LSB is further increased comparing to the case of initial transmission. In case of MSB, the difference of bit error probability between component bits which are subjected to MSB is also increased.

Horizontal bitwise optimization makes a role to reduce the difference of reliability between coded bits. The performance of decoding depends on how much the distribution of reliability of bits can be uniform. As the distribution of bits becomes to be uniform, more coding gain can be obtained. Therefore, horizontal bitwise operations are used to maximize coding gain in retransmission. We regard two operations such as swapping and inversion as horizontal bitwise mapping. The swapping operation makes the decision boundary corresponding to MSB and LSB to be exchanged each other during retransmission.

Figure 14:
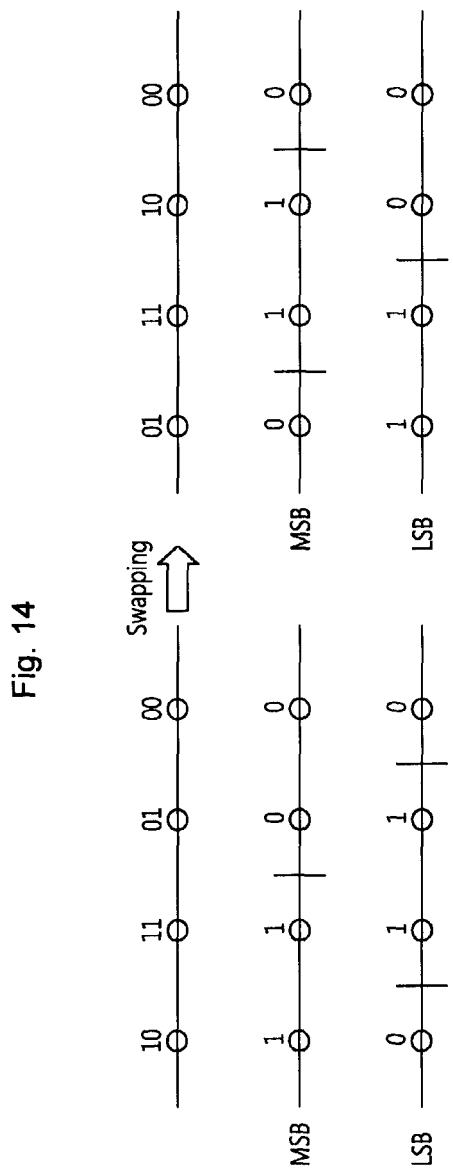
FIG. 14 shows a swapping operation.
Figure 15:
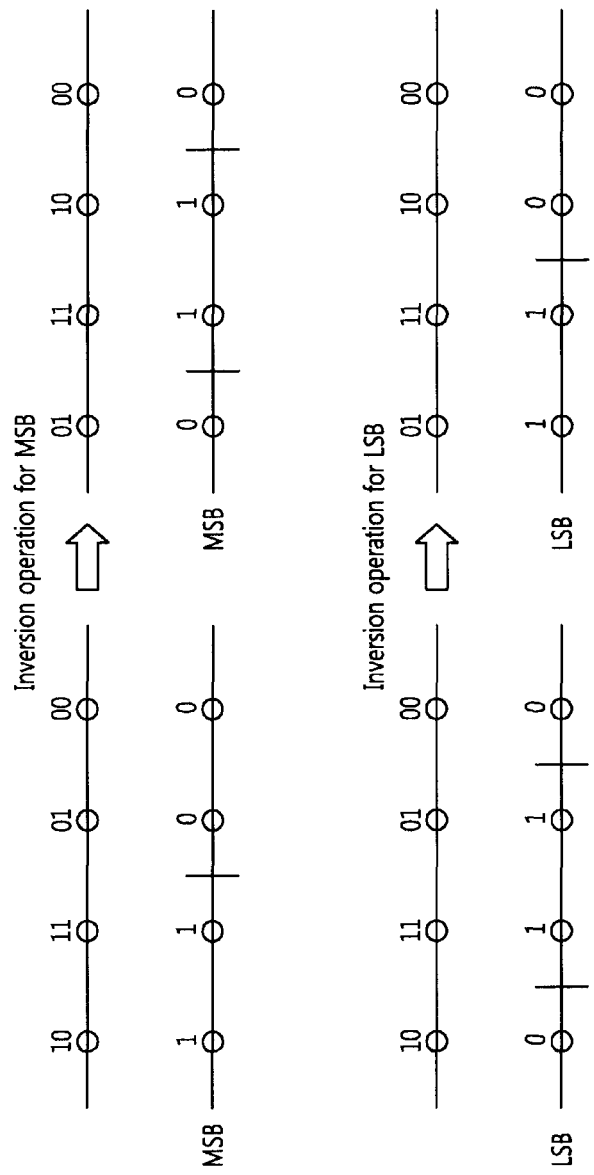
FIG. 15 shows an inversion operation.

FIG. 14 shows swapping operation and FIG. 15 shows inversion operation. In FIG. 13, it is shown that the number of decision boundary for MSB and LSB is one and two, respectively. When employing swapping operation during retransmission, the decision boundary for MSB and LSB is swapped to result in decreasing the difference of the bit error probability between MSB and LSB as shown in FIG. 14. Inversion bitwise operation makes the difference of bit error probability of candidate component bits to be decreased. In this case, decision boundary is not exchanged between MSB and LSB. As shown in FIG. 15, inversion for LSB is only valid. Therefore, when we need to average the probability of bit error between candidate component bits subjected to LSB, i.e. for the applying the inversion operation to a component bit which has not more than two decision boundary, we need swapping operation with inversion operation.

Under employing HARQ, the proposed design criterion to optimize horizontal bitwise mapping for $2^L$-QAM is represented as shown:

MathFigure 26

$$\{\mu_m\} = \underset{\mu_i \in \mu}{\arg\text{Max}} \left| \frac{1}{2^{L/2-1}L} \sum_k^{2^{L/2}} \sum_j^{L/2} Q\left(\sqrt{\frac{1}{2\sigma_n^2} \sum_{i=1}^m |\mu_i(d_{j,k})|^2}\right) - \frac{1}{2^{L/2-1}L} \sum_k^{2^{L/2}} \sum_j^{L/2} Q\left(\sqrt{\frac{1}{2\sigma_n^2} \sum_{i=1}^{m-1} |\mu_i(d_{j,k})|^2}\right) \right| \quad \text{[Math. 26]}$$

where $d_{j,k}$ represents the distance of k-th candidate component bit subject to j-th component bit (i.e. MSB or LSB etc.). $\mu_i$ denotes a horizontal mapping at i-th retransmission. $\mu$ indicates the set of horizontal mapping. The number of combination that we can compose from bitwise swapping and inversion is $_{L/2}C_2 \cdot (2^{L/2}-1)$. But, we can reduce the number of combination through the assumptions that bit inversion operation is only valid when there are more than two decision boundaries and we can know the difference of bit error probability between component bits from the approach-based Q-function. In case of 16-QAM, optimal horizontal mapping set can be calculated by comparisons of between 4 cases at every retransmission.

Table 4 shows a comparison of bit error probability of the swapping operation during first retransmission and that of conventional chase combining.

TABLE 4

| component bits | Chase combining (none + none) | | Chase combining (none + swapping) | |
|---|---|---|---|---|
| | MSB | LSB | MSB | LSB |
| 10 | $\frac{1}{4}Q\left(\frac{3\sqrt{2}\,d}{\sigma_n}\right)$ | $\frac{1}{4}Q\left(\frac{\sqrt{2}\,d}{\sigma_n^2}\right)$ | $\frac{1}{4}Q\left(\frac{\sqrt{10}\,d}{\sigma_n}\right)$ | $\frac{1}{4}Q\left(\frac{\sqrt{10}\,d}{\sigma_n}\right)$ |
| 11 | $\frac{1}{4}Q\left(\frac{\sqrt{2}\,d}{\sigma_n}\right)$ | $\frac{1}{4}Q\left(\frac{\sqrt{2}\,d}{\sigma_n^2}\right)$ | $\frac{1}{4}Q\left(\frac{\sqrt{2}\,d}{\sigma_n}\right)$ | $\frac{1}{4}Q\left(\frac{\sqrt{2}\,d}{\sigma_n}\right)$ |
| 01 | $\frac{1}{4}Q\left(\frac{\sqrt{2}\,d}{\sigma_n}\right)$ | $\frac{1}{4}Q\left(\frac{\sqrt{2}\,d}{\sigma_n^2}\right)$ | $\frac{1}{4}Q\left(\frac{\sqrt{2}\,d}{\sigma_n}\right)$ | $\frac{1}{4}Q\left(\frac{\sqrt{2}\,d}{\sigma_n}\right)$ |
| 00 | $\frac{1}{4}Q\left(\frac{3\sqrt{2}\,d}{\sigma_n}\right)$ | $\frac{1}{4}Q\left(\frac{\sqrt{2}\,d}{\sigma_n^2}\right)$ | $\frac{1}{4}Q\left(\frac{\sqrt{10}\,d}{\sigma_n}\right)$ | $\frac{1}{4}Q\left(\frac{\sqrt{10}\,d}{\sigma_n}\right)$ |
| Average 1 | $\frac{1}{2}Q\left(\frac{3\sqrt{2}\,d}{\sigma_n}\right) + \frac{1}{2}Q\left(\frac{\sqrt{2}\,d}{\sigma_n}\right)$ | $Q\left(\frac{\sqrt{2}\,d}{\sigma_n}\right)$ | $\frac{1}{2}Q\left(\frac{\sqrt{10}\,d}{\sigma_n}\right) + \frac{1}{2}Q\left(\frac{\sqrt{2}\,d}{\sigma_n}\right)$ | $\frac{1}{2}Q\left(\frac{\sqrt{10}\,d}{\sigma_n}\right) + \frac{1}{2}Q\left(\frac{\sqrt{2}\,d}{\sigma_n}\right)$ |
| Average 2 | $\frac{1}{4}Q\left(\frac{3\sqrt{2}\,d}{\sigma_n}\right) + \frac{3}{4}Q\left(\frac{\sqrt{2}\,d}{\sigma_n}\right) \cong \frac{3}{4}Q\left(\frac{\sqrt{2}\,d}{\sigma_n}\right)$ | | $\frac{1}{2}Q\left(\frac{\sqrt{10}\,d}{\sigma_n}\right) + \frac{1}{2}Q\left(\frac{\sqrt{2}\,d}{\sigma_n}\right) \cong \frac{1}{2}Q\left(\frac{\sqrt{2}\,d}{\sigma_n}\right)$ | |

The difference of bit error probability between MSB and LSB is decreased via swapping operation which is a significant improvement in terms of the average probability of bit error.

Through our proposed design criterion for horizontal bitwise mapping, we can find the optimal mapping sets for both 16-QAM and 64-QAM as shown in Table 5.

TABLE 5

| # of trans. | Mapping set |
|---|---|
| (a) 16 QAM | |
| 0 | $i_1 q_1 i_2 q_2$ |
| 1 | $i_2 q_2 \overline{i_1 q_1}$ |
| 2 | $i_1 q_1 \overline{i_2 q_2}$ |
| 3 | $i_2 q_2 \overline{i_1} q_1$ |
| (b) 64 QAM | |
| 0 | $i_1 q_1 i_2 q_2 i_3 q_3$ |
| 1 | $i_3 q_3 \overline{i_2 q_2} i_1 q_1$ |
| 2 | $i_2 q_2 \overline{i_3 q_3} i_1 q_1$ |
| 3 | $i_1 q_1 \overline{i_2 q_2} i_3 q_3$ |

Figure 16:
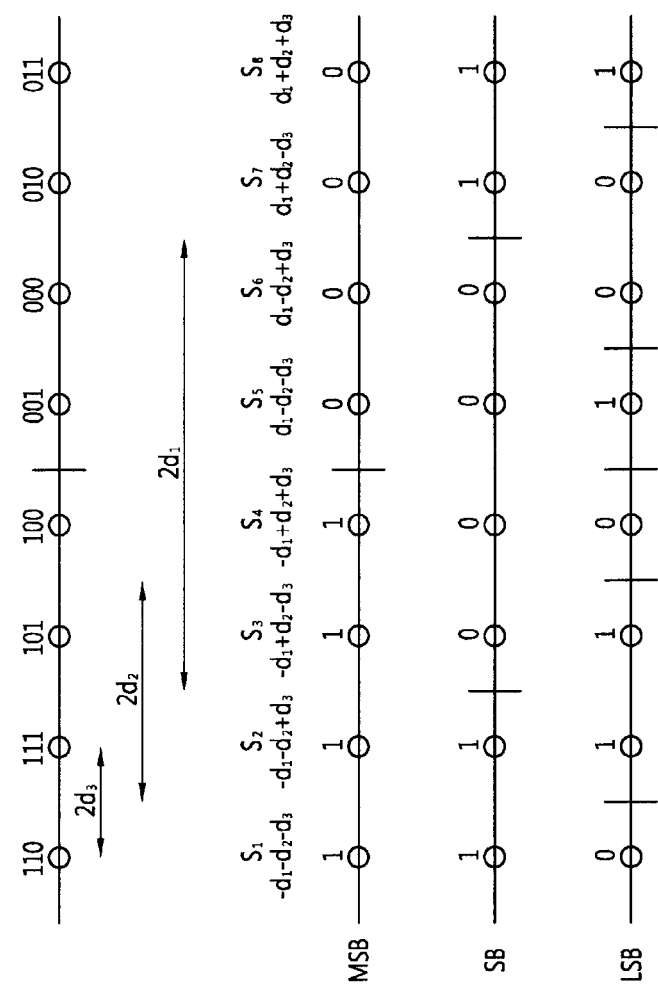
FIG. 16 shows decision boundary of 8-pulse amplitude modulation (PAM).

The types of component bits of 64-QAM are divided into three sorts which are MSB, SB and LSB, respectively. The corresponding decision boundary on each component bit is introduced in FIG. 16. FIG. 16 shows decision boundary of 8-PAM. The difference of bit error probability between component bits within 64-QAM is larger than that of 16-QAM. Also, the difference of bit error probability between candidate component bits is significantly increased. For the first retransmission, averaging the difference of both the probability of bit error between MSB and LSB and the probability of bit error between candidate component bits corresponding to SB through swapping and inversion, respectively, is the best choice in terms of average bit error probability. For the second retransmission, employing second swapping operation between MSB and LSB after first swapping operation between MSB and SB with inversion operation of MSB has the best average bit error probability. Finally, in case of third retransmission, we find the optimal horizontal mapping that employs the inversion for SB through Equation 26.

Hereinafter, vertical bitwise mapping is disclosed.

HARQ schemes for multiple antenna system can exploit a spatial diversity. But, HARQ schemes such as Space Time Coding (STC)-HARQ are hard to obtain enough gain by spatial diversity due to time latency between retransmissions. Furthermore, because spatial diversity is only related to the increase of received SNR, the difference of reliability between component bits cannot be decreased by spatial selective diversity. It even aggravates the reliability difference.

In order to analyze the effect of vertical bitwise mapping, the channel model for 2 by 2 MIMO systems is defined by $h_{a,b}$. The indexes of transmit antenna and retransmission are denoted by a and b, respectively. Under an assumption that the selectivity of time channel is small during retransmission, $h_{a,b}$ can be represented by Equation 27.

MathFigure 27

$$h_{a,i} \approx h_{a,i+1} = h_a \quad [\text{Math.27}]$$

In addition to the case of time selective channel, low spatial selective channel can be also represented by Equation 28.

MathFigure 28

$$h_{a,i} \approx h_{a+1,i} = h_a \quad [\text{Math.28}]$$

Let us assume the low mobility channel under a rich scattering environment. In addition, 4-PAM for simpler analysis of vertical bitwise mapping is considered. The probability of error for a conventional HARQ-CC can be formulated as shown:

MathFigure 29

$$\frac{1}{8}Q\left(\frac{\sqrt{2|h_{1,i}|^2}\,d}{\sigma_n}\right) + \frac{1}{4}Q\left(\frac{\sqrt{2|h_{1,i}|^2}\,d}{\sigma_n}\right) + \frac{1}{8}Q\left(\frac{\sqrt{2|h_{2,i}|^2}\,d}{\sigma_n}\right) + \frac{1}{4}Q\left(\frac{\sqrt{2|h_{2,i}|^2}\,d}{\sigma_n}\right) \quad [\text{Math. 29}]$$

where i indicates the index of retransmission. We know that there is no additional gain extracted from either time or spatial channel diversity. Considering MSB shuffling between two transmit antennas during retransmission, the average probability of bit error is given as shown below.

MathFigure 30

$$\frac{1}{4}Q\left(\frac{\sqrt{|h_{1,i}|^2+|h_{2,i}|^2}\,d}{\sigma_n}\right) + \frac{1}{2}Q\left(\frac{\sqrt{2|h_{1,i}|^2}\,d}{\sigma_n}\right) \quad [\text{Math. 30}]$$

In case of LSB shuffling, the average probability of bit error is calculated as shown below.

MathFigure 31

$$\frac{1}{4}Q\left(\frac{\sqrt{2|h_{1,i}|^2}\,d}{\sigma_n}\right) + \frac{1}{2}Q\left(\frac{\sqrt{|h_{1,i}|^2+|h_{2,i}|^2}\,d}{\sigma_n}\right) \quad [\text{Math. 31}]$$

Finally, symbol shuffling is expressed as shown below.

MathFigure 32

$$\frac{1}{4}Q\left(\frac{\sqrt{|h_{1,i}|^2+|h_{2,i}|^2}\,d}{\sigma_n}\right) + \frac{1}{2}Q\left(\frac{\sqrt{|h_{1,i}|^2+|h_{2,i}|^2}\,d}{\sigma_n}\right) \quad [\text{Math. 32}]$$

In the above analysis, according to the number of bits that exchanged between antennas, the corresponding average bit error probability can be calculated by approach-based Q-function as same as for horizontal bitwise mapping. Through this analysis, we can know that MSB shuffling is the lowest average bit error probability. The following one of low bit error probability is LSB shuffling. The average bit error probability of symbol level shuffling is lower than that of conventional HARQ-CC, but is higher than that of 1-bit shuffling. In the similar way, we can compare with all cases of bit error probability derived by vertical mapping under a channel model and find a set of optimal vertical mapping.

Considering both horizontal bitwise mapping and vertical bitwise mapping, the proposed design criterion for the optimal bitwise mapping is represented as shown:

MathFigure 33

$$\{\gamma_m, \mu_m\} = \underset{\substack{\mu_i \in \mu \\ \gamma_i \in \gamma}}{\arg\text{Max}} \quad [\text{Math. 33}]$$

$$\left| \frac{1}{2^{L/2-1}L} \sum_k^{2^{L/2}} \sum_j^{L/2} Q\left(\sqrt{\frac{1}{2\sigma_n^2}\sum_{i=1}^{m}|\gamma_i(h_{j,k})|^2|\mu_i(d_{j,k})|^2}\right) - \frac{1}{2^{L/2-1}L} \sum_k^{2^{L/2}} \sum_j^{L/2} Q\left(\sqrt{\frac{1}{2\sigma_n^2}\sum_{i=1}^{m-1}|\gamma_i(h_{j,k})|^2|\mu_i(d_{j,k})|^2}\right) \right|$$

where $\gamma_i$ a vertical mapping at i-th retransmission. $\gamma_i$ subject to a set of vertical mapping $\gamma$. As well as the way to reduce the size of set in Equation 26, we can reduce the size of set of candidate vertical mapping in course of finding the set of optimal vertical mapping as excluding the cases with low priority. From our design criterion for a combination of horizontal bitwise mapping and vertical bitwise mapping, Table 6 shows the set of optimal mapping.

TABLE 6

| # of retransmission | Optimal mapping |
|---|---|
| (a) 16-QAM | |
| 0 | $i_{1,1}q_{1,1}i_{1,2}q_{1,2}$ |
|   | $i_{2,1}q_{2,1}i_{2,2}q_{2,2}$ |
| 1 | $i_{1,2}q_{1,2}i_{2,1}q_{2,1}$ |
|   | $i_{2,2}q_{2,2}\underline{i_{1,1}q_{1,1}}$ |
| 2 | $i_{1,1}q_{1,1}\underline{i_{2,2}q_{2,2}}$ |
|   | $i_{2,1}q_{2,1}\underline{i_{1,2}q_{1,2}}$ |
| 3 | $i_{1,2}q_{1,2}\underline{i_{2,1}q_{2,1}}$ |
|   | $i_{2,2}q_{2,2}\underline{i_{1,1}q_{1,1}}$ |
| (b) 64-QAM | |
| 0 | $i_{1,1}q_{1,1}i_{1,2}q_{1,2}i_{1,3}q_{1,3}$ |
|   | $i_{2,1}q_{2,1}\underline{i_{2,2}q_{2,2}}i_{2,3}q_{2,3}$ |
| 1 | $i_{2,3}q_{2,3}\underline{i_{2,2}q_{1,2}}i_{2,1}q_{1,1}$ |
|   | $i_{1,3}q_{2,3}\underline{i_{1,2}q_{2,2}}i_{1,1}q_{2,1}$ |
| 2 | $i_{2,2}q_{2,2}\underline{i_{2,3}q_{2,3}}i_{2,1}q_{1,1}$ |
|   | $i_{1,2}q_{1,2}\underline{i_{1,3}q_{1,3}}i_{1,1}q_{2,1}$ |
| 3 | $i_{2,1}q_{1,1}\underline{i_{2,2}q_{2,2}}i_{2,3}q_{2,3}$ |
|   | $i_{1,1}q_{2,1}\underline{i_{1,2}q_{2,2}}i_{1,3}q_{2,3}$ |

The proposed bitwise mapping is simulated for 16-QAM with Convolution Turbo Coding (CTC) of rate ½ under a 2 by 2 MIMO channel. The most parameter for performance evaluation follows the standard specification of IEEE 802.16e. For channel model, the typical urban (TU) is considered as frequency selective MIMO channel. Also, time latency between retransmissions is 5 ms and the number of retransmissions is considered up to 3. Full usage of the subchannels (FUSC) which is one of distributed resource allocation is considered to obtain the coding gain on frequency domain as sufficient as possible. The type of receiver is based on linear Minimum Mean Square Error (MMSE) equalizer. For 10 MHz bandwidth, the number of subcarriers is 1024.

Figure 17:
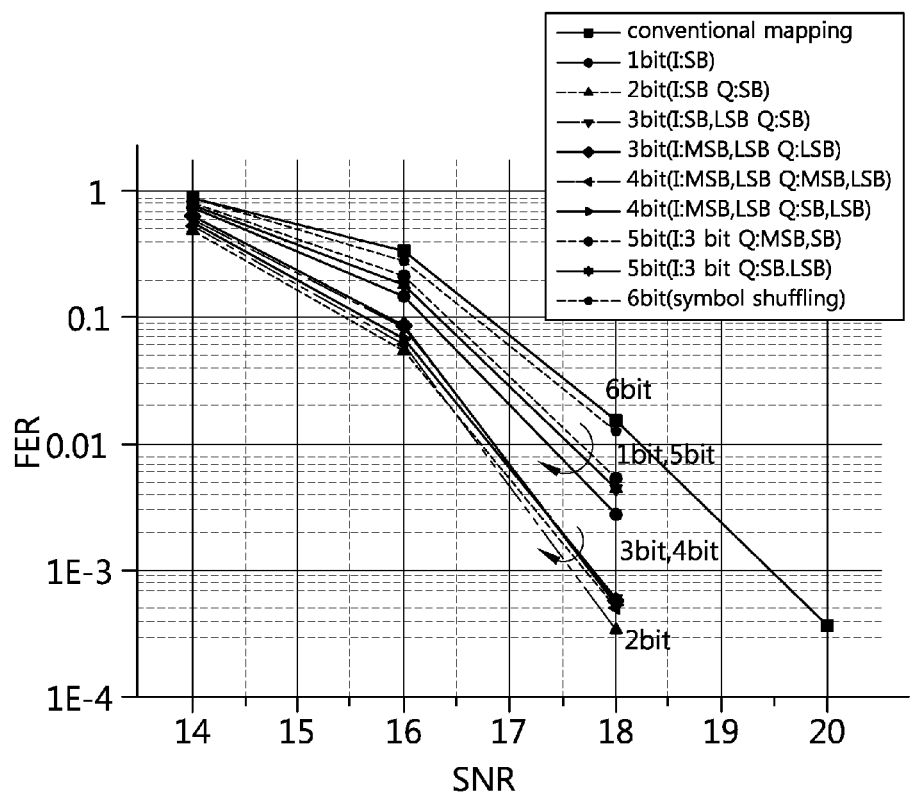
FIG. 17 shows frame error rate (FER) performances according to the number of bits shuffled between transmit antennas.

FIG. 17 shows Frame Error Rate (FER) performances according to the number of bits shuffled between transmit antennas. Simulation is performed on all possible combinations which can be exchanged between transmit antennas by component bits within 64-QAM. Based on the analysis for the vertical bit mapping, we can know that probability of average bit error for SB shuffling between transmit antennas has the best performance at 1% FER. The result of simulation also corresponds to the analysis of probability of bit error-based Q-function.

Figure 18:
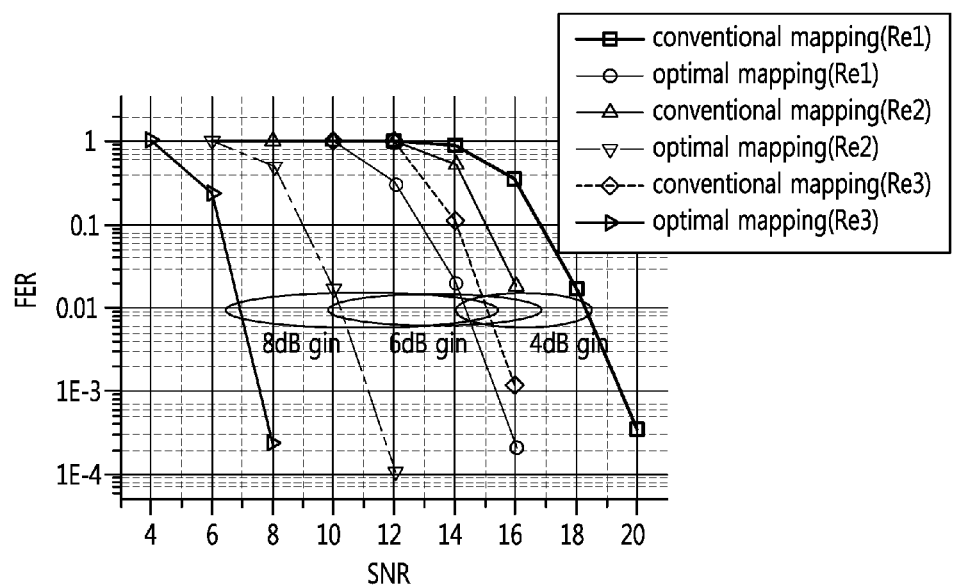
FIG. 18 shows a comparison result of FER performances of optimal bitwise mapping and conventional mapping.

FIG. 18 compares the FER performance of optimal bitwise mapping and conventional mapping (i.e. HARQ-CC). As opposed to the typical scheme in which the combining gain is decreased, as the number of retransmissions is increased, the proposed optimal bitwise mapping always obtains the combining gain of almost about 2 dB regardless of the number of retransmissions. In case of third retransmission, the proposed scheme provides about 8 dB gain over the conventional mapping. This performance is due to the coding gain which can be obtained by diversity gain extracted from time selectivity and spatial selectivity through proposed bitwise mapping.

III. Constellation Rearrangement for IR Resource

In case of circular buffer-based HARQ-incremental redundancy (IR), a redundancy version is transmitted in every retransmission. Coded bits, which are the same as those previously transmitted, can be transmitted when the redundancy version is transmitted. In this case, constellation rearrangement can be performed for these coded bits. A swapping operation and/or an inversion operation can be performed for constellation rearrangement.

Figure 19:
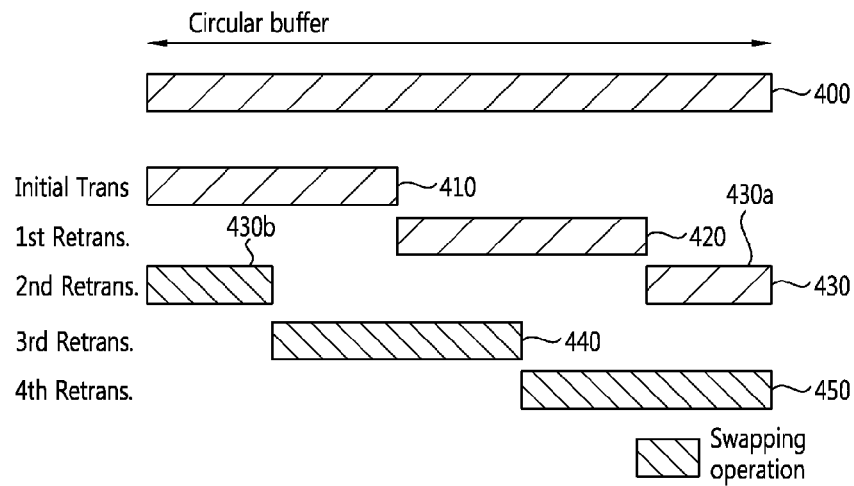
FIG. 19 shows hybrid automatic repeat request (HARQ)-incremental redundancy (IR) using a swapping operation.

FIG. 19 shows HARQ-IR using a swapping operation. A cyclic buffer 400 stores a code block. An initial data block 410 is a part of the code block and is initially transmitted. According to a retransmission request of the initial data block 410, in 1st retransmission, a 1st retransmission block 420 subsequent to the initial data block 410 in the cyclic buffer 400 is transmitted. In 2nd retransmission, a 2nd retransmission block 430 consists of a non-wraparound block 430a and a wraparound block 430b according to a characteristic of the cyclic buffer 400. The wraparound block 430b denotes a block which has previously been transmitted (or retransmitted) one time when HARQ is performed. The wraparound block 430b included in the 2nd retransmission block 430 is wrapped around with a part of the initial data block 410. By performing the swapping operation for constellation rearrangement on the wraparound block 430b, reliability differences for all bits are averaged. In case of 16-QAM, bit reliabilities of MSB and LSB can be swapped and then averaged. In case of 64?QAM, bit reliabilities of MSB, SB, and LSB can be swapped and then averaged. In 3rd retransmission, since all parts of a 3rd retransmission block 440 belong to a data block which has previously been transmitted one time, the 3rd retransmission block 440 is a wraparound block and thus constellation rearrangement is performed thereon. In 4th retransmission, since all parts of a 4th retransmission block 450 belong to a data block which has previously been transmitted one time, the 4th retransmission block 450 is a wraparound block and thus constellation rearrangement is performed thereon.

The size of cyclic buffer and the size of redundancy version transmitted according to the maximum number of retransmissions are for exemplary purposes only, and thus the technical features of the present invention are not limited thereto. In addition, the swapping operation for constellation rearrangement is also for exemplary purposes only, and thus an inversion operation, a spatial operation, and a combination of the two operations can also be performed.

Figure 20:
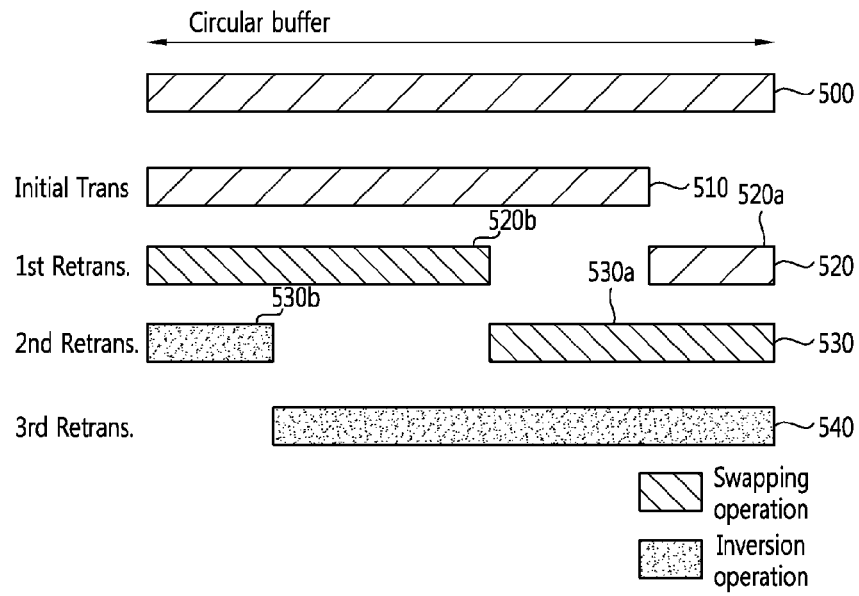
FIG. 20 shows HARQ-IR using a swapping operation and an inversion operation.

FIG. 20 shows HARQ-IR using a swapping operation and an inversion operation. A cyclic buffer 500 stores a code block. An initial data block 510 is a part of the code block and is initially transmitted. According to a retransmission request of the initial data block 510, in 1st retransmission, a 1st retransmission block 520 subsequent to the initial data block 510 in the cyclic buffer 500 is transmitted. The 1st retransmission block 520 consists of a non-wraparound block 520a and a wraparound block 520b according to a characteristic of the cyclic buffer 500. This is because the wrap-around block 520b included in the 1st retransmission block 520 is wrapped around with a part of the initial data block 510. The swapping operation for constellation rearrangement is performed on the wraparound block 520b. In 2nd retransmission, a 2nd retransmission block 530 consists of one-time wraparound block 530a and a two-time wrap-around block 530b. The one-time wrapped block 530a denotes a block which has previously been transmitted one time in a wraparound manner. The two-time wrapped block 530b denotes a block which has previously been transmitted two times in a wrap-around manner. A constellation rearrangement pattern may vary according to the number of wraparounds. Herein, the one-time wrapped block 530a uses the swapping operation, and the two-time wrapped block 530b uses the inversion operation. All parts of a 3rd retransmission block 540 are 2-time wraparound blocks, and the inversion operation is performed thereon. The constellation rearrangement pattern depends on the number of wraparounds and thus may vary according to the number of wraparounds. However, the technical features of the present invention are not limited to the number of wraparounds or the constellation rearrangement pattern.

Tables 7 and 8 below show bitwise mapping for each modulation scheme according to the number of wraparounds in a process of retransmitting coded bits in a cyclic buffer. 16-QAM is used in Table 7. 64-QAM is used in Table 8.

TABLE 7

| # of wraparound | Mapping rule |
| --- | --- |
| 0 | $i_1 q_1 i_2 q_2$ |
| 1 | $i_2 q_2 i_1 q_1$ |
| 2 | $i_1 q_1 \overline{i_2 q_2}$ |
| 3 | $i_2 q_2 \overline{i_1 q_1}$ |

TABLE 8

| # of wraparound | Mapping rule |
| --- | --- |
| 0 | $i_1 q_1 i_2 q_2 i_3 q_3$ |
| 1 | $i_3 q_3 \overline{i_2 q_2} i_1 q_1$ |
| 2 | $i_2 q_2 \overline{i_3 q_3} i_1 q_1$ |
| 3 | $i_1 q_1 \overline{i_2 q_2} i_3 q_3$ |

A single antenna system is considered in the HARQ-IR. For the HARQ-IR of the MIMO system, spatial bitwise rearrangement can also be performed to obtain spatial diversity. Constellation rearrangement is performed between transmit antennas whenever coded bits in a cyclic buffer are transmitted in a wraparound manner in a retransmission process. For example, when retransmission is first made in a wrap-around manner, a swapping operation is performed on the signal constellation and also spatial bitwise mapping is performed between antennas. When retransmission is secondly made in a wraparound manner, an inversion operation is performed on the signal constellation and also spatial bitwise mapping is performed between antennas.

Tables 9 and 10 below show bitwise mapping for each modulation scheme according to the number of wraparounds in a process of retransmitting coded bits in a cyclic buffer in a multiple antenna system having two transmit antennas. 16-QAM is used in Table 9. 64-QAM is used in Table 10. In $i_{a,b}$ and $q_{a,b}$, 'a' denotes an antenna index, and 'b' denotes an index indicating coordinates on the constellation.

TABLE 9

| # of wraparound | Mapping rule |
| --- | --- |
| 0 | $i_{1,1} q_{1,1} i_{1,2} q_{1,2}$ |
|   | $i_{2,1} q_{2,1} i_{2,2} q_{2,2}$ |
| 1 | $i_{1,2} q_{1,2} i_{2,1} q_{2,1}$ |
|   | $i_{2,2} q_{2,2} \overline{i_{1,1} q_{1,1}}$ |
| 2 | $i_{1,1} q_{1,1} \overline{i_{2,2} q_{2,2}}$ |
|   | $i_{2,1} q_{2,1} \overline{i_{1,2} q_{1,2}}$ |
| 3 | $i_{1,2} q_{1,2} \overline{i_{2,1} q_{2,1}}$ |
|   | $i_{2,2} q_{2,2} \overline{i_{1,1} q_{1,1}}$ |

TABLE 10

| # of wraparound | Mapping rule |
| --- | --- |
| 0 | $i_{1,1} q_{1,1} i_{1,2} q_{1,2} i_{1,3} q_{1,3}$ |
|   | $i_{2,1} q_{2,1} i_{2,2} q_{2,2} i_{2,3} q_{2,3}$ |
| 1 | $i_{2,3} q_{1,3} \overline{i_{2,2} q_{1,2}} i_{2,1} q_{1,1}$ |
|   | $i_{1,3} q_{2,3} \overline{i_{1,2} q_{2,2}} i_{1,1} q_{2,1}$ |
| 2 | $i_{2,2} q_{2,2} \overline{i_{2,3} q_{2,3}} i_{2,1} q_{1,1}$ |
|   | $i_{2,2} q_{1,2} \overline{i_{1,3} q_{1,3}} i_{1,1} q_{1,2,1}$ |
| 3 | $i_{2,1} q_{1,1} \overline{i_{2,2} q_{1,1}} i_{2,3} q_{1,3}$ |
|   | $i_{1,1} q_{2,1} \overline{i_{1,2} q_{2,2}} i_{1,3} q_{2,3}$ |

To obtain frequency diversity, when symbols are mapped to subcarriers in a retransmission process, mapping can be extended towards noncontiguous subcarriers to perform bitwise rearrangement on a signal constellation. Frequency diversity can be additionally obtained by extending mapping towards the noncontiguous subcarriers. In the mapping from the symbols to the subcarriers, an additional HARQ gain can be ensured by applying constellation rearrangement to obtain an average reliability of coded bits.

Figure 21:
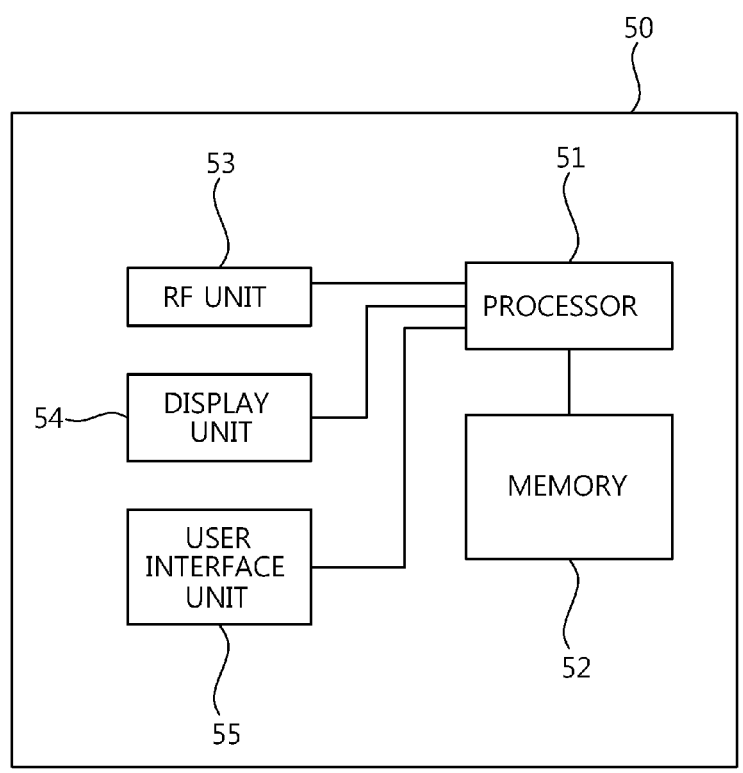
FIG. 21 is a block diagram showing an apparatus for wireless communication according to an embodiment of the present invention.

FIG. 21 is a block diagram showing an apparatus for wireless communication according to an embodiment of the present invention. An apparatus 50 for wireless communication may be a part of a UE. The apparatus 50 for wireless communication includes a processor 51, a memory 52, a radio frequency (RF) unit 53, a display unit 54, and a user interface unit 55. The RF unit 53 is coupled to the processor 51 and transmits and/or receives radio signals. The memory 52 is coupled to the processor 51 and stores an operating system, applications, and general files. The display unit 54 displays a variety of information of the UE and may use a well-known element such as a liquid crystal display (LCD), an organic light emitting diode (OLED), etc. The user interface unit 55 can be configured with a combination of well-known user interfaces such as a keypad, a touch screen, etc. With an implemented physical layer, the processor 51 supports the aforementioned constellation rearrangement and HARQ. The proposed method can be implemented by the processor 51.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for performing hybrid automatic repeat request (HARQ) increment redundancy (IR) in a wireless communication system, the method comprising:
    storing encoded information bits into a circular buffer;
    selecting a transport block which is a part of the encoded information bits in the circular buffer to perform HARQ IR;

mapping the transport block onto a constellation for $2^n$-Quadrature Amplitude Modulation (QAM) in accordance with a mapping rule, where n denotes a modulation order; and transmitting the mapped transport block to a receiver, wherein a starting point of the transport block in the circular buffer is changed for HARQ retransmission, wherein the mapping rule is changed when transmitted bits wrap-around at the end of the circular buffer, wherein the mapping rule is changed between a first mapping rule and a second mapping rule, wherein each n bits in the transport block is mapped on the constellation for $2^n$-QAM, and the first mapping rule is $\{b_0, \ldots, b_{n-1}\}$ and the second mapping rule is $\{b_{n-1}, \ldots, b_0\}$, and wherein n is four or six.

2. A transmitter configured to perform hybrid automatic repeat request (HARQ) increment redundancy (IR) in a wireless communication system, comprising:

a radio frequency (RF) unit configured to transmit and receive a radio signal; and a processor coupled with the RF unit and configured to:
store encoded information bits into a circular buffer;
select a transport block which is a part of the encoded information bits in the circular buffer to perform HARQ IR;
map the transport block onto a constellation for $2^n$-Quadrature Amplitude Modulation (QAM) in accordance with a mapping rule, where n denotes a modulation order; and
instruct the RF unit to transmit the mapped transport block to a receiver, wherein a starting point of the transport block in the circular buffer is changed for HARQ retransmission, wherein the mapping rule is changed when transmitted bits wrap-around at the end of the circular buffer, wherein the mapping rule is changed between a first mapping rule and a second mapping rule, wherein each n bits in the transport block is mapped on the constellation for $2^n$-QAM, and the first mapping rule is $\{b_0, \ldots, b_{n-1}\}$ and the second mapping rule is $\{b_{n-1}, \ldots, b_0\}$, and wherein n is four or six.

* * * * *